United States Patent
Fu et al.

(10) Patent No.: US 11,205,420 B1
(45) Date of Patent: Dec. 21, 2021

(54) SPEECH PROCESSING USING A RECURRENT NEURAL NETWORK

(71) Applicant: Amazon Technologies, Inc., Seattle, WA (US)

(72) Inventors: Gengshen Fu, Sharon, MA (US); Thibaud Senechal, Somerville, MA (US); Shiv Naga Prasad Vitaladevuni, Belmont, MA (US); Michael J. Rodehorst, Belmont, MA (US); Varun K. Nagaraja, Cambridge, MA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 16/436,562

(22) Filed: Jun. 10, 2019

(51) Int. Cl.
| | |
|---|---|
| *G10L 15/16* | (2006.01) |
| *G10L 15/22* | (2006.01) |
| *G10L 15/06* | (2013.01) |
| *G06N 3/04* | (2006.01) |
| *G06N 3/02* | (2006.01) |
| *G10L 25/30* | (2013.01) |
| *G10L 15/08* | (2006.01) |

(52) U.S. Cl.
CPC .............. *G10L 15/16* (2013.01); *G06N 3/02* (2013.01); *G06N 3/04* (2013.01); *G06N 3/0454* (2013.01); *G06N 3/0481* (2013.01); *G10L 15/06* (2013.01); *G10L 15/22* (2013.01); *G10L 25/30* (2013.01); *G10L 2015/088* (2013.01)

(58) Field of Classification Search
CPC .... G10L 2015/088; G10L 15/16; G10L 25/30
See application file for complete search history.

(56) References Cited

U.S. PATENT DOCUMENTS

| | | | |
|---|---|---|---|
| 2016/0099010 A1* | 4/2016 | Sainath | G06N 3/0445 704/232 |
| 2016/0180838 A1* | 6/2016 | Parada San Martin | G06N 3/02 704/232 |
| 2018/0061396 A1* | 3/2018 | Srinivasan | G10L 15/08 |
| 2018/0189269 A1* | 7/2018 | Quirk | G06F 40/289 |
| 2018/0261213 A1* | 9/2018 | Arik | G06N 3/08 |
| 2018/0276532 A1* | 9/2018 | Kim | G06N 20/00 |
| 2019/0005945 A1* | 1/2019 | Hofer | G06N 3/0445 |
| 2019/0043488 A1* | 2/2019 | Booklet | G06N 7/005 |
| 2019/0057683 A1* | 2/2019 | Sak | G10L 15/22 |
| 2020/0349927 A1* | 11/2020 | Stoimenov | G10L 15/063 |
| 2021/0055778 A1* | 2/2021 | Myer | G06F 3/167 |

* cited by examiner

*Primary Examiner* — Samuel G Neway
(74) *Attorney, Agent, or Firm* — Pierce Atwood LLP

(57) ABSTRACT

A system and method performs wakeword detection using a neural network model that includes a recurrent neural network (RNN) for processing variable-length wakewords. To prevent the model from being influenced by non-wakeword speech, multiple instances of the model are created to process audio data, and each instance is configured to use weights determined by training data. The model may instead or in addition be used to process the audio data only when a likelihood that the audio data corresponds to the wakeword is greater than a threshold. The model may process the audio data as represented by groups of acoustic feature vectors; computations for feature vectors common to different groups may be re-used.

20 Claims, 26 Drawing Sheets

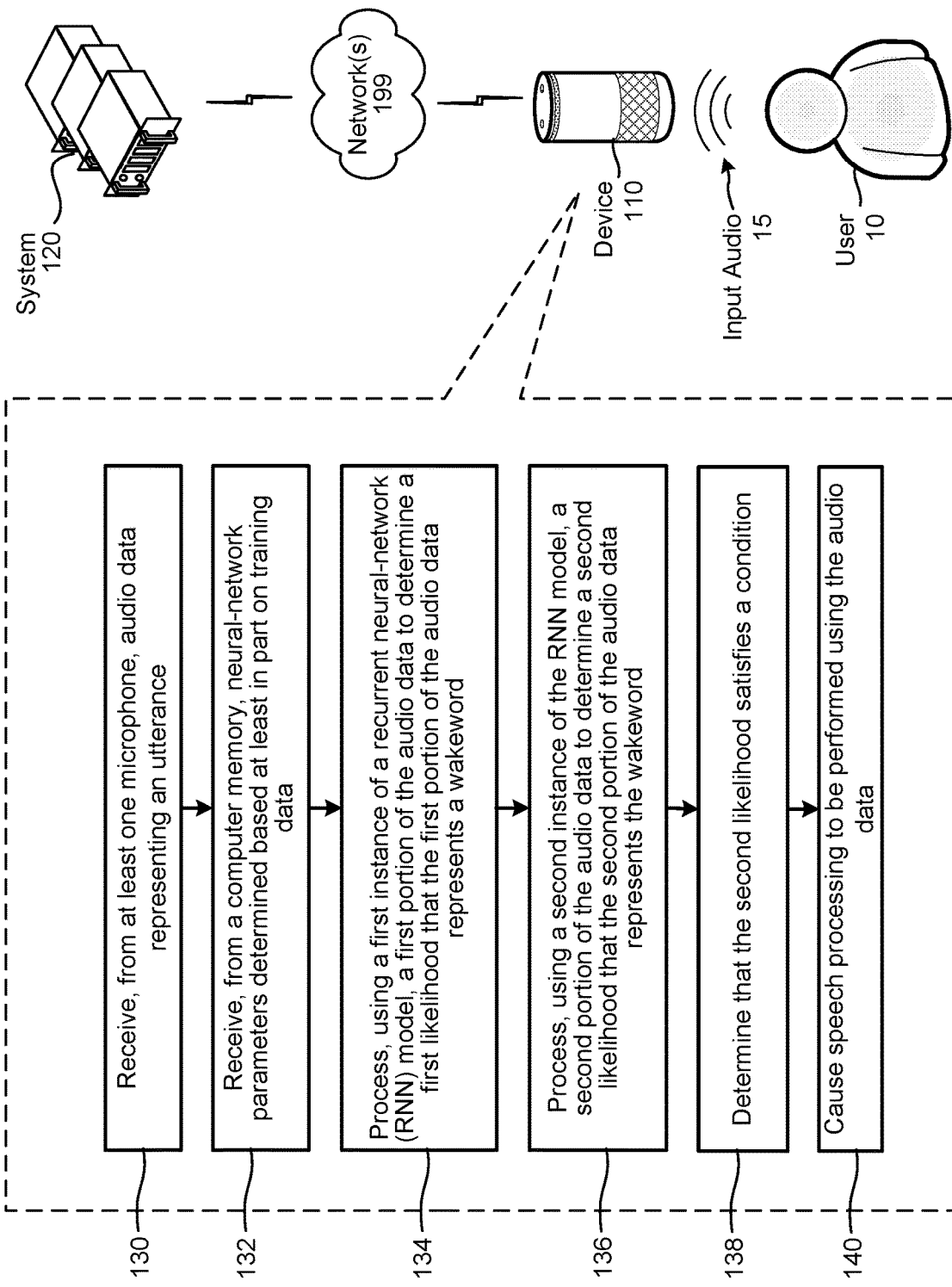

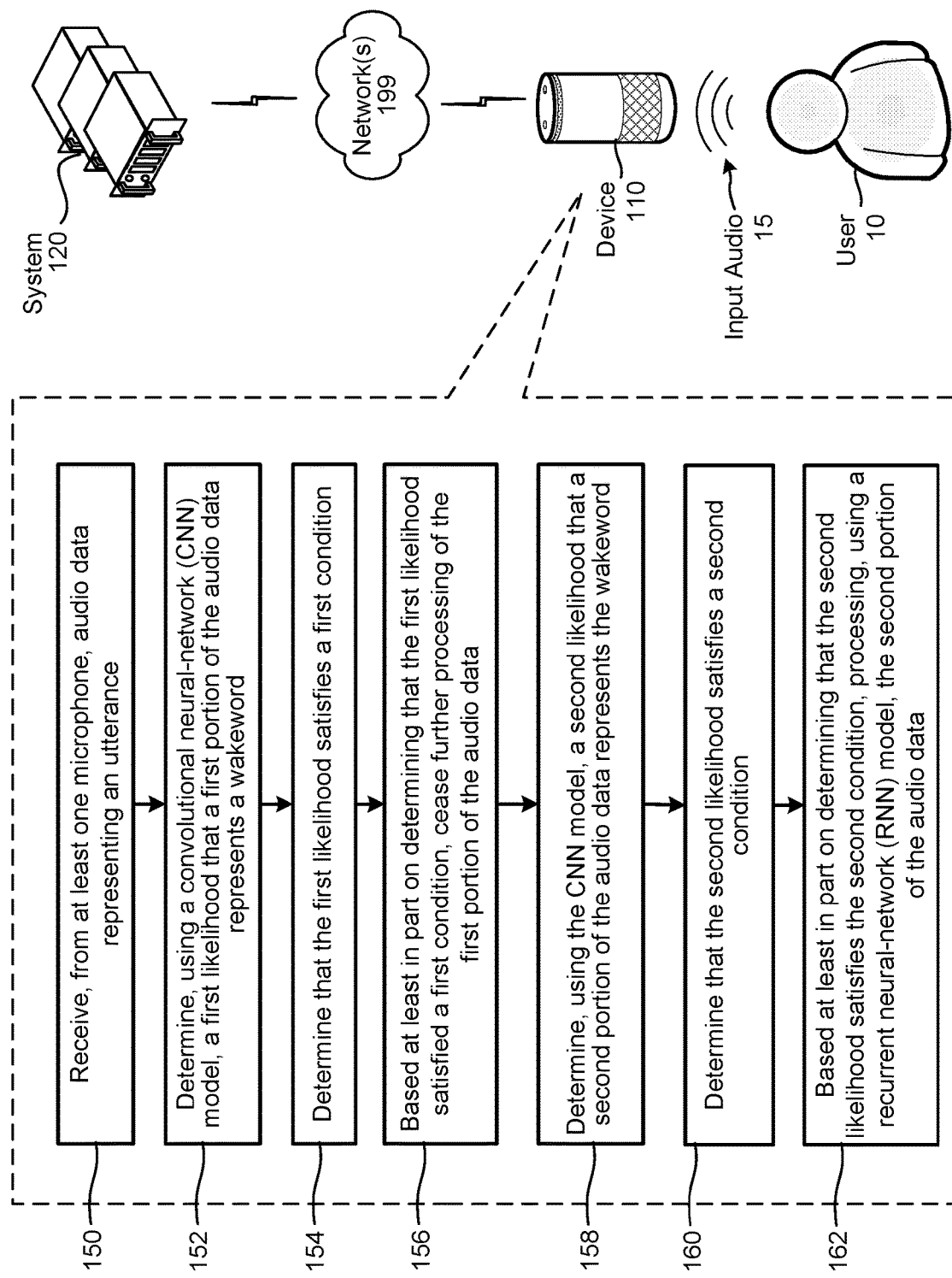

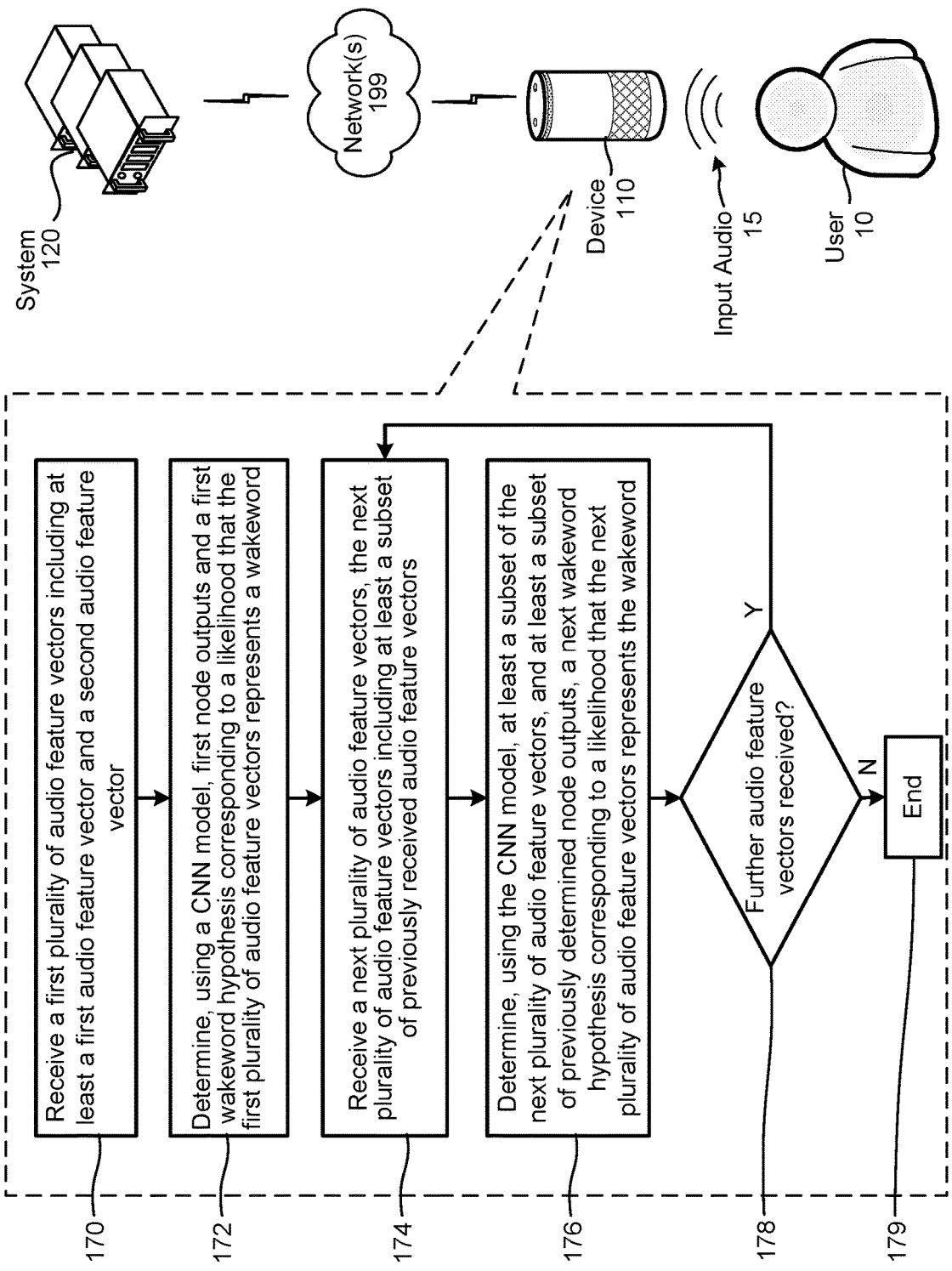

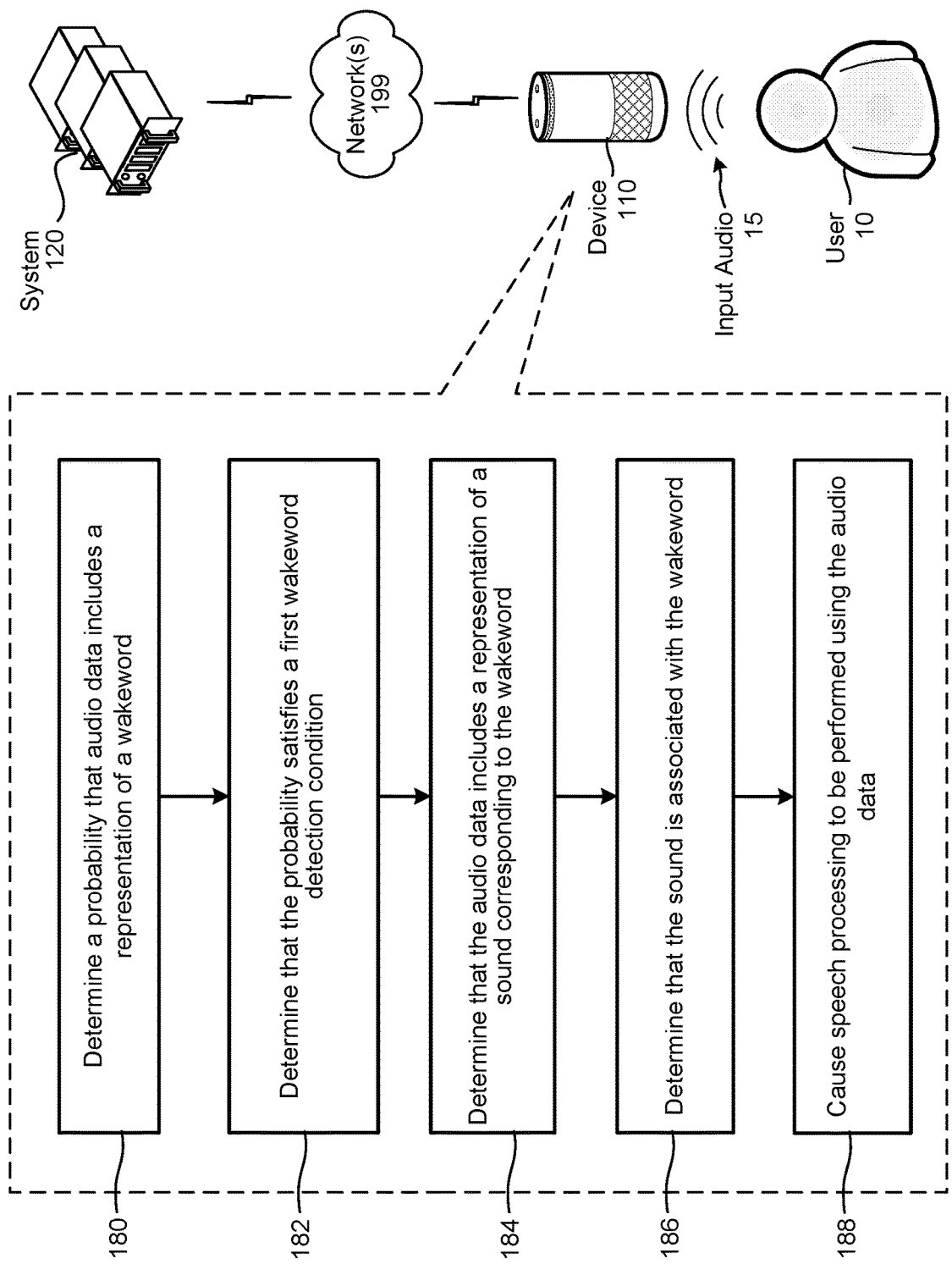

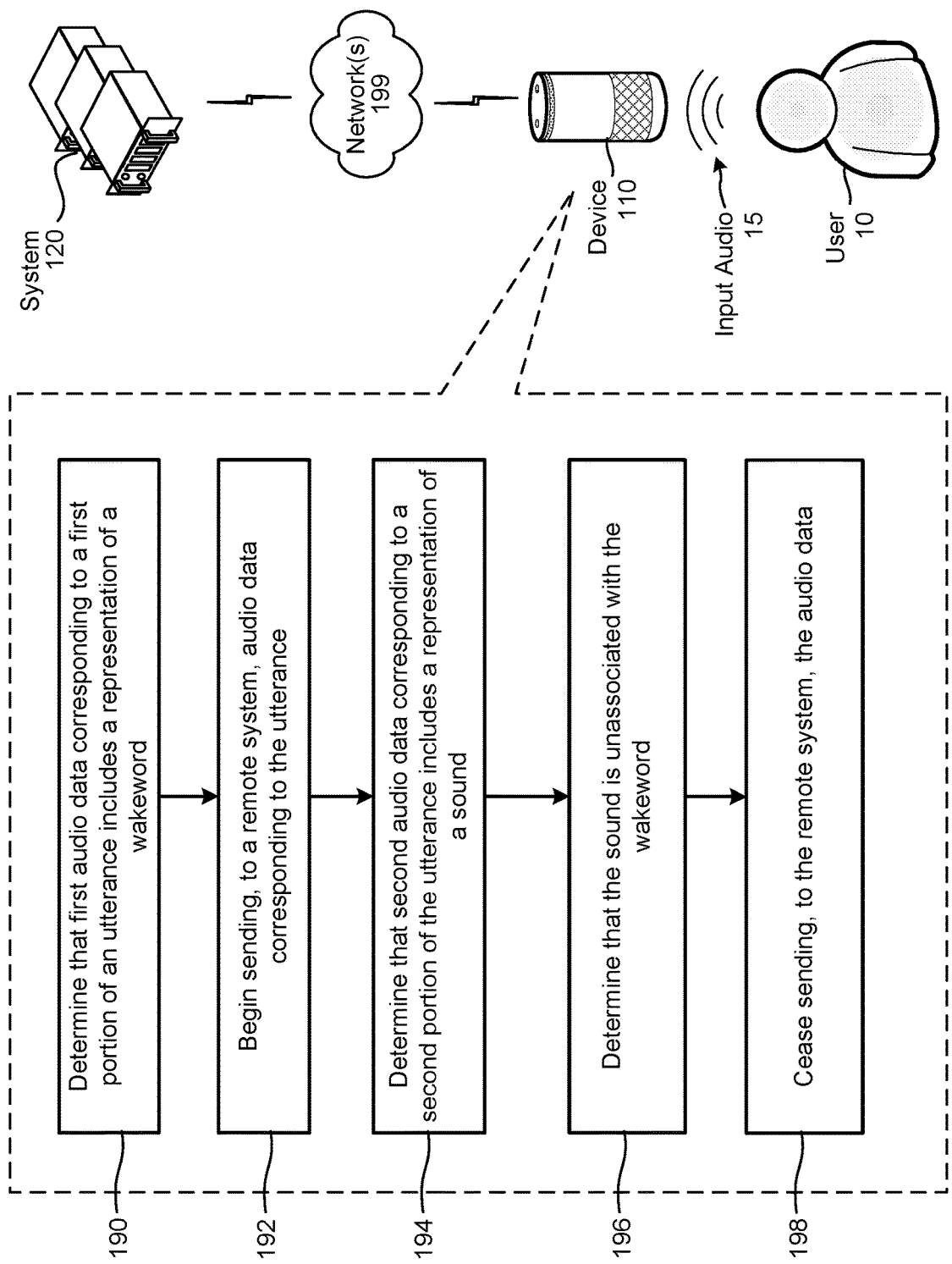

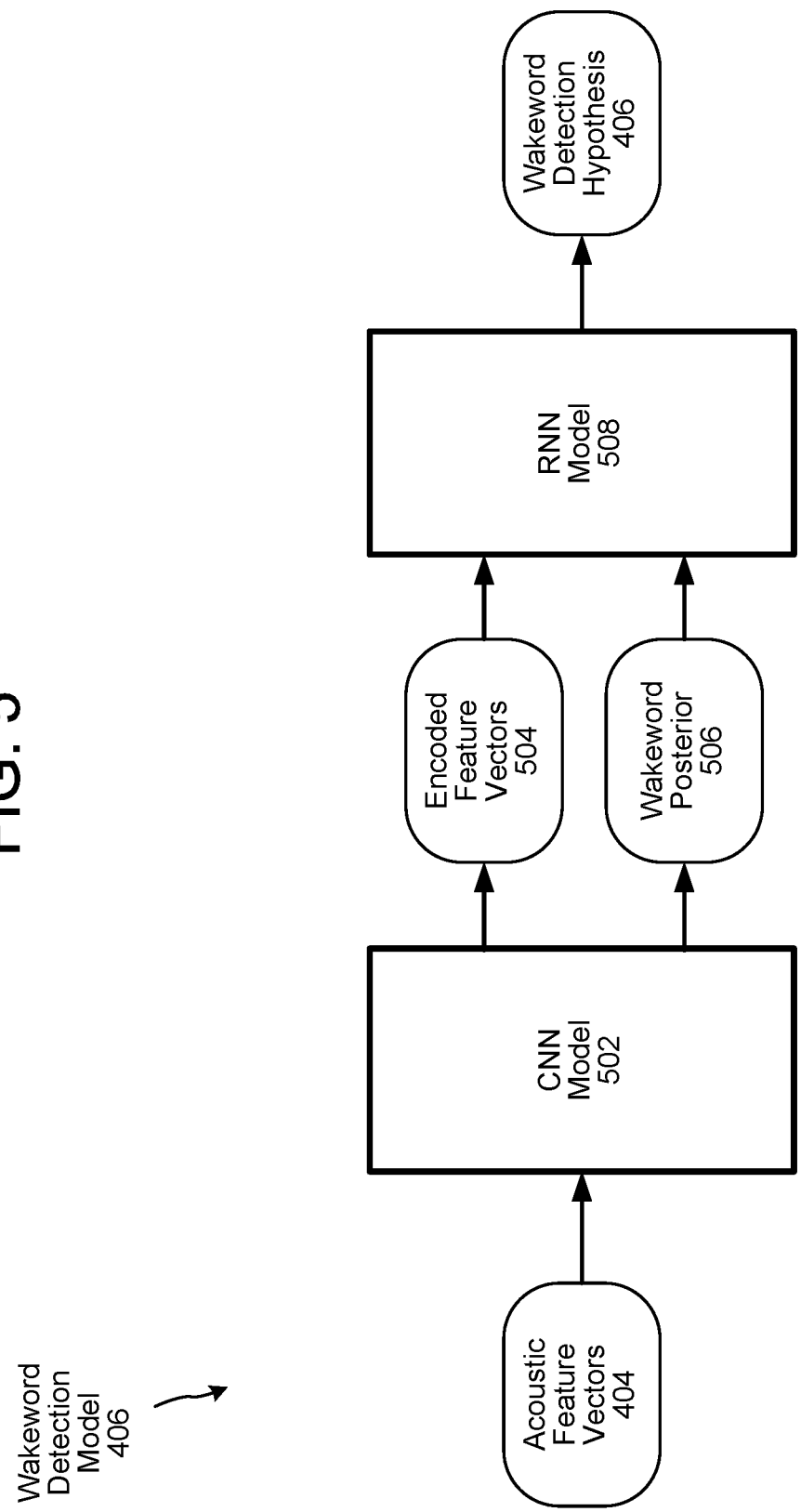

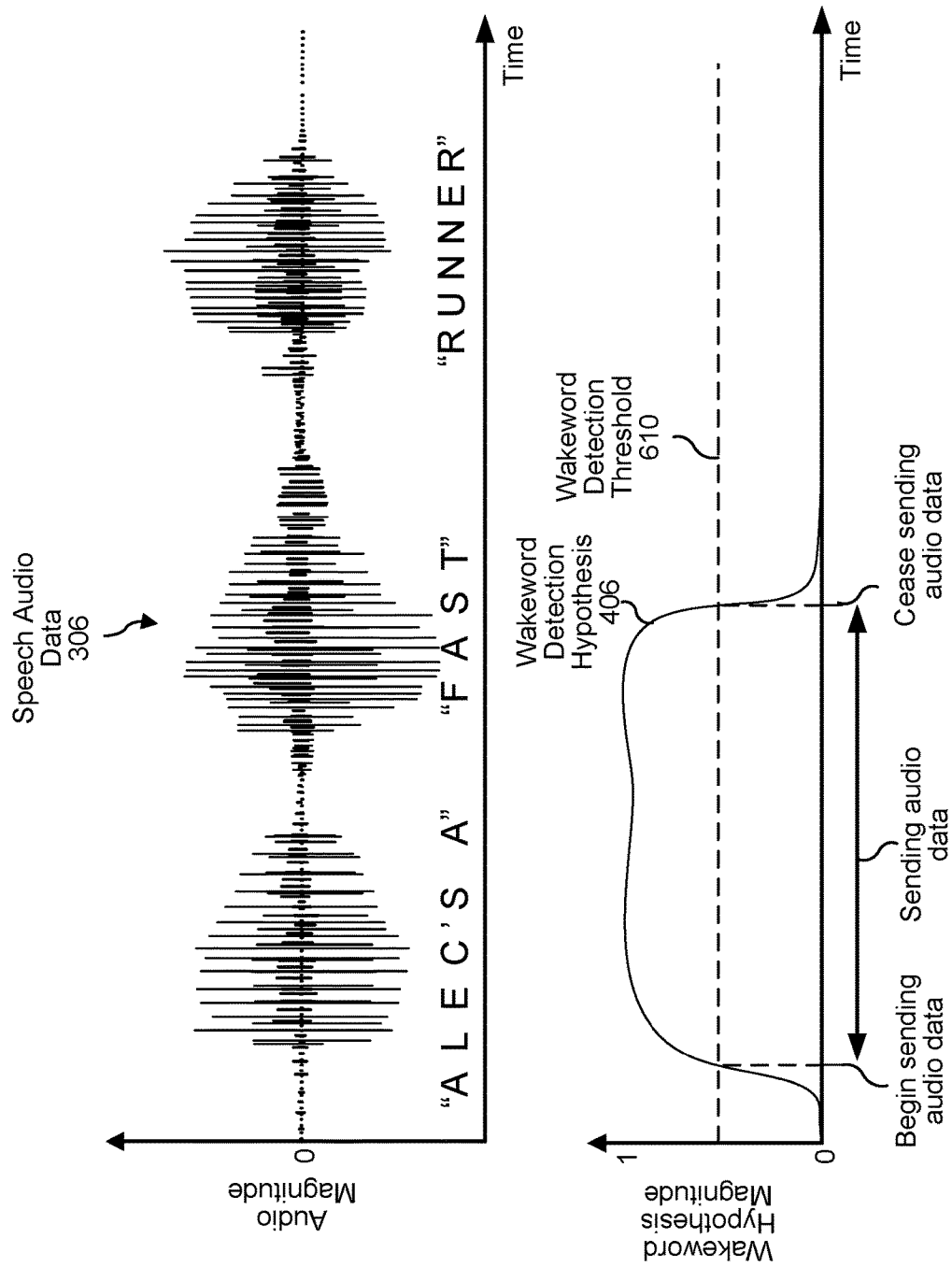

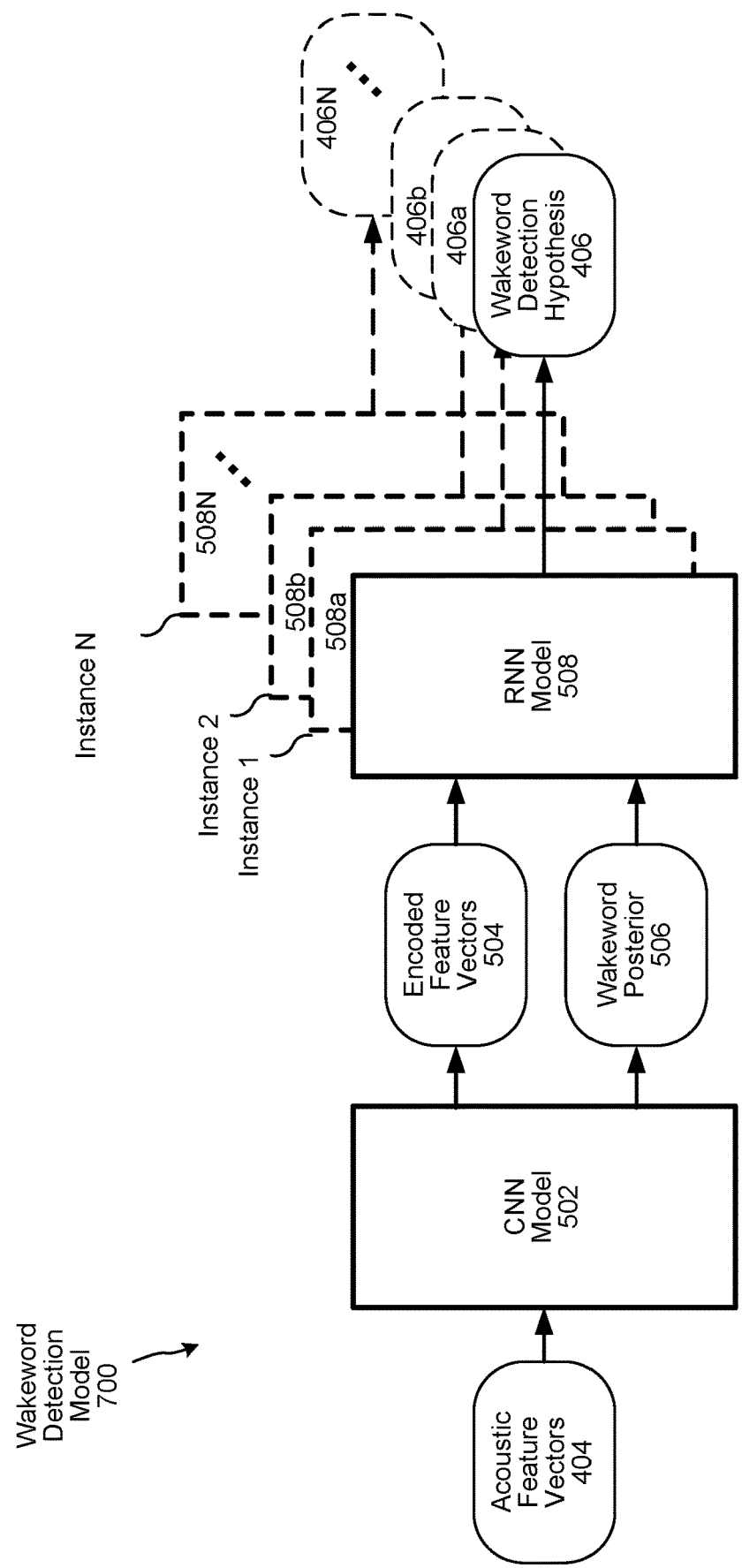

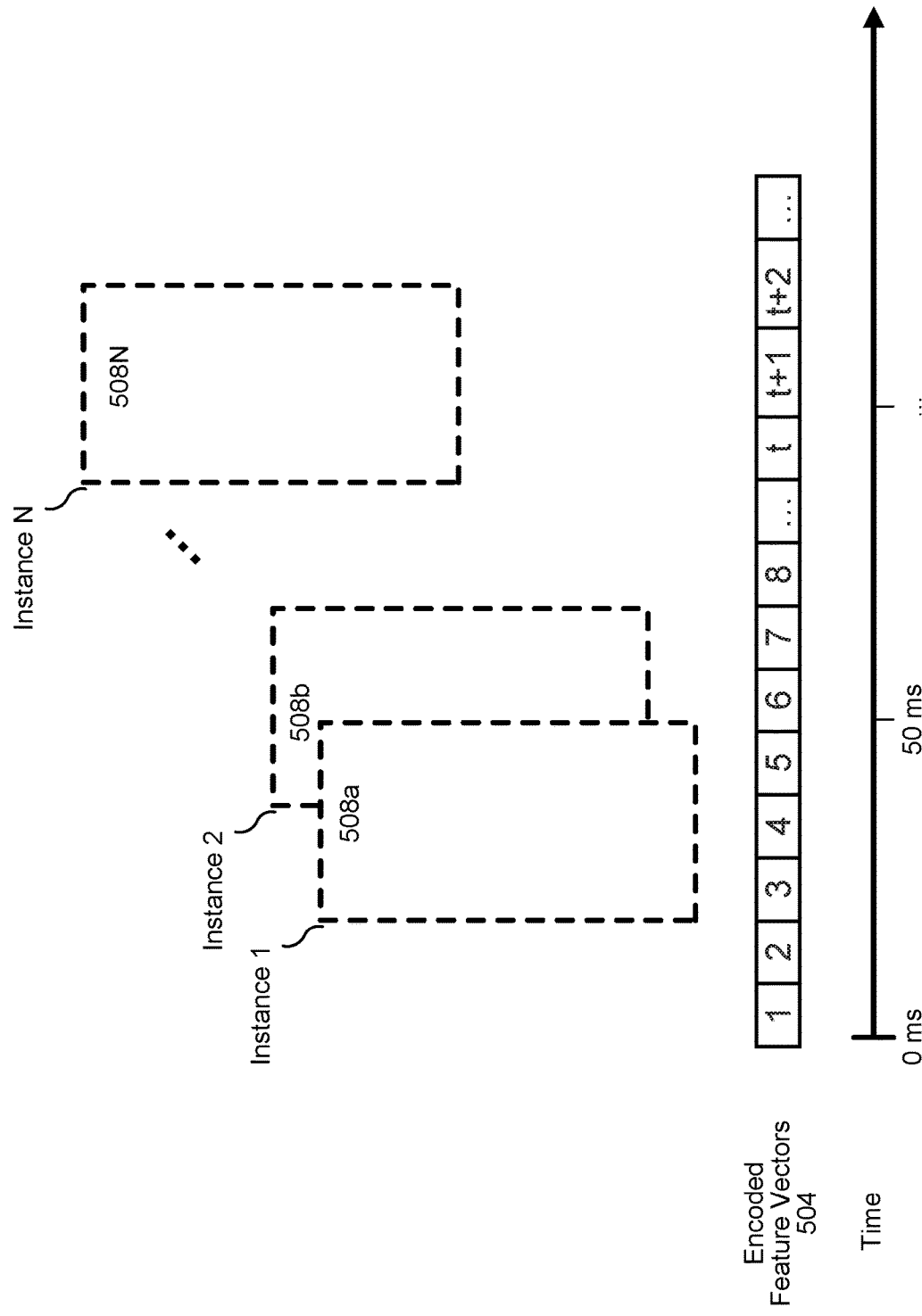

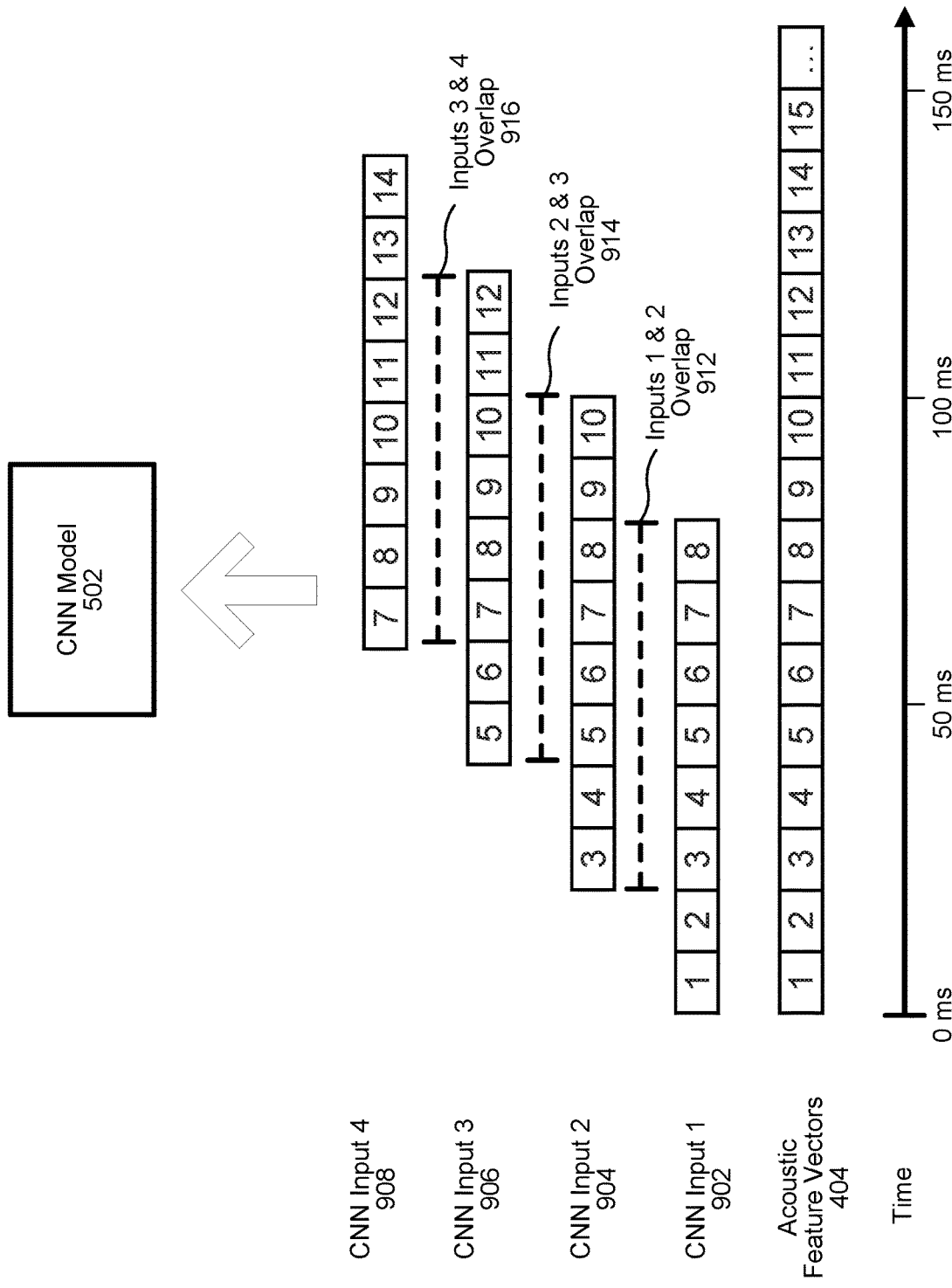

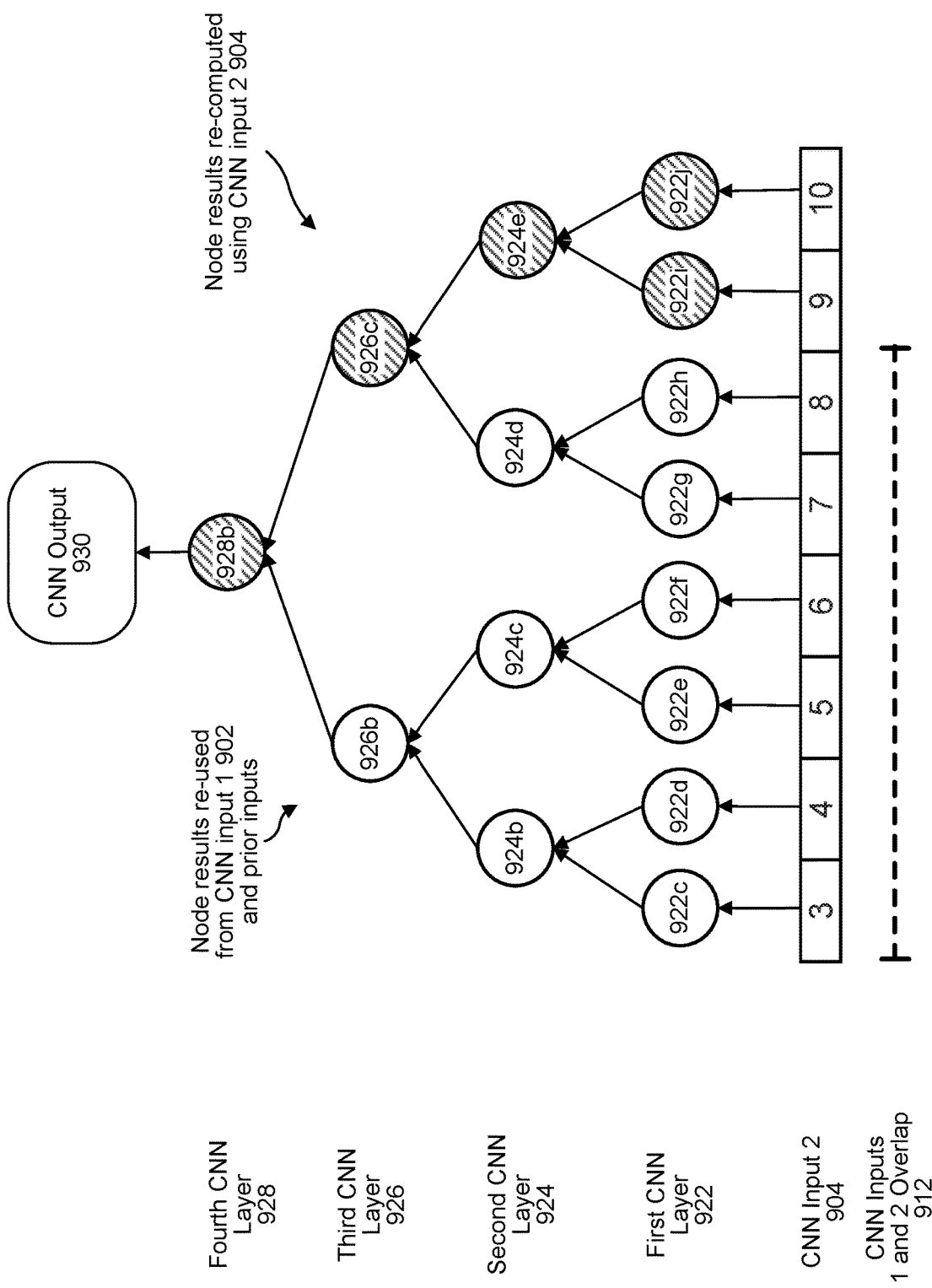

SPEECH PROCESSING USING A RECURRENT NEURAL NETWORK

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1E illustrate systems for detecting a wakeword in accordance with embodiments of the present disclosure.

FIG. 5 illustrates a wakeword-detection model in accordance with embodiments of the present disclosure.

FIGS. 6B and 6C illustrate detecting a false positive or false negative detection of a wakeword in accordance with embodiments of the present disclosure.

FIGS. 7A and 7B illustrate a system using instances of a wakeword-detection model in accordance with embodiments of the present disclosure.

FIGS. 9A-9E illustrate using a computer memory to store and re-use node results in accordance with embodiments of the present disclosure.

DETAILED DESCRIPTION

Figure 2:
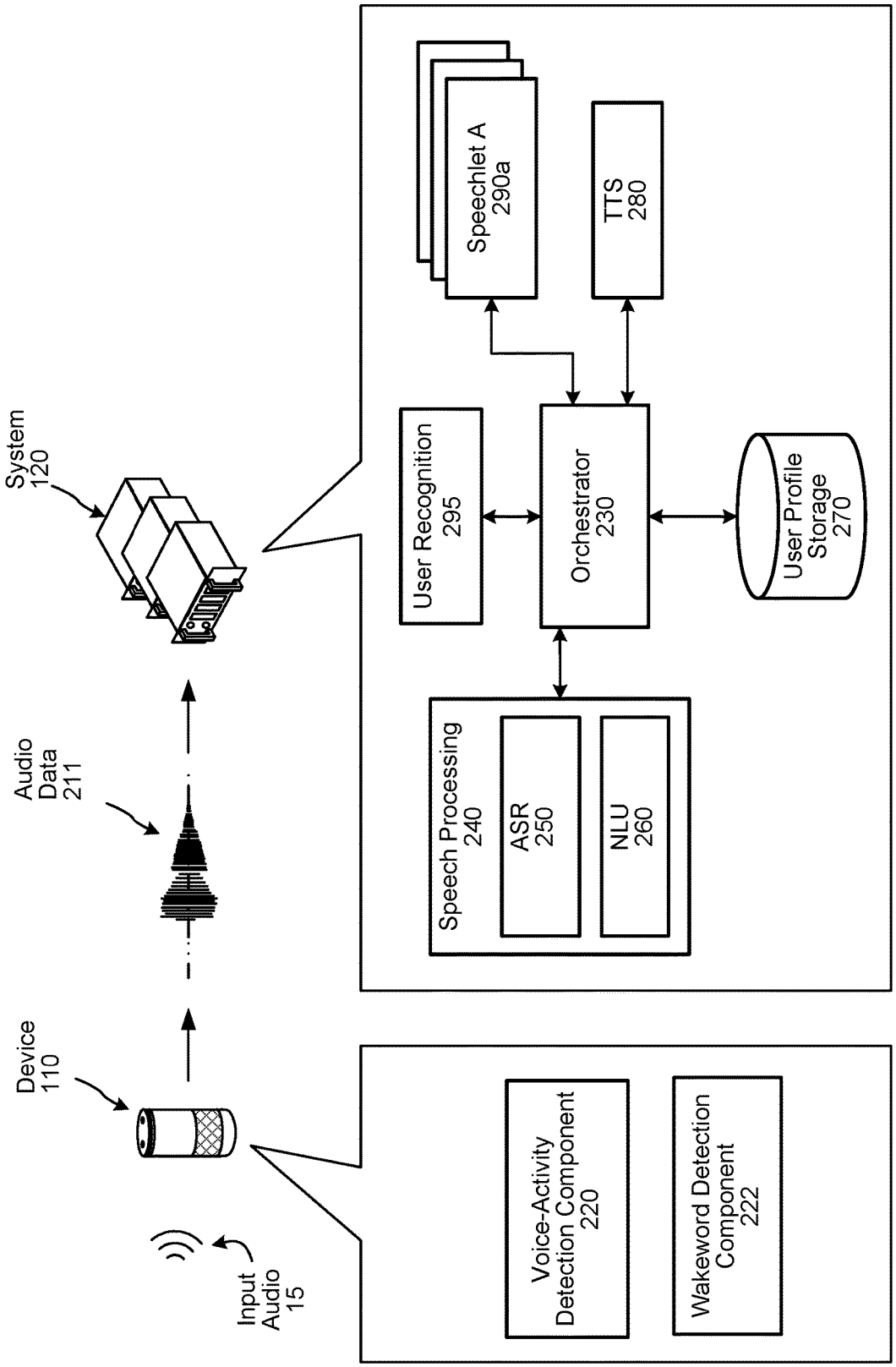
FIG. 2 illustrates components of a system for detecting a wakeword in accordance with embodiments of the present disclosure.

Automatic speech recognition (ASR) is a field of computer science, artificial intelligence, and linguistics involving transforming audio data associated with speech into text representative of that speech. Natural language understanding (NLU) is a field of computer science, artificial intelligence, and linguistics concerned with enabling computers to derive meaning from input data representing natural language (e.g., text data and/or audio data). ASR and NLU are often used together as part of a speech processing system.

In some embodiments, a local device having one or more microphones is configured to capture speech from a user and convert those sounds into an audio signal; the local device then performs the speech processing. In other embodiments, a distributed computing environment may be used to perform the speech processing. An example distributed environment may involve the local device and a remote device; the local device may send the audio signal to the remote device, which then performs the speech processing. The command may then be executed by a combination of remote and local devices depending on the command itself.

A local device and/or components of the device and/or system may be configured to activate upon a user speaking a particular command—sometimes referred to herein as a "wakeword"—to activate functionality by the local device (e.g., send and/or process audio data) in expectation of the user speaking a further command directed to the system. Some components, such as a voice-activity detection (VAD) component (discussed in greater detail below) may continually listen for speech; upon detection of speech, the VAD component may activate other components, such as a wakeword-detection component. The wakeword may include an indication for the system to perform further processing. For example, a system may be configured to detect a wakeword and then process any subsequent audio following the wakeword (and, in some embodiments, some amount of pre-wakeword audio) to detect any commands in the subsequent audio. As an example, a wakeword may include a name by which a user refers to a device. Thus, if the wakeword is "Alexa," a user may command a local voice-controlled device to play music by saying "Alexa, play some music." The local device may continually receive and process audio to detect the wakeword. Upon the local device recognizing the wakeword "Alexa," the local device may process the subsequent audio (in this example, "play some music") to determine a command. Additionally or alternatively, the local device may send audio data corresponding to detected speech to a remote device to perform speech processing on that audio to determine the command for execution. Provided services/commands may include performing actions, rendering media, obtaining and/or providing information, and/or initiating Internet-based services on behalf of the user.

In certain circumstances the local device may include its own ASR system for processing audio data to determine corresponding text data. The local ASR system may be configured to understand only a subset of all possible words that may be understood by a full ASR system operating on one or more remote system(s). For example, a full ASR system operating on remote device(s) may be capable of detecting 10,000 different sounds corresponding to words or parts of words, or "acoustic units"; the local ASR system, in contrast, may be capable of detecting only 3,000-4,000 acoustic units. The acoustic units may be, in some embodiments, phones, phonemes, diphones, triphones, and/or senones.

Some wakeword detection systems include neural networks to process audio data; a neural network is a computer program that includes a plurality of nodes that process an input and produce an output in accordance with one or more weights. The neural network may be trained using training data, as described in greater detail below. A wakeword detection system may use a convolutional neural network (CNN) to process data representing speech, which may include feature vectors; as explained in greater detail below, however, wakewords may be uttered in varying amounts of time due to differences in rates of speech and/or differences in the wakewords themselves. A first, fast speaker may utter a wakeword in the span of one second; a second, slower speaker may utter the wakeword in the span of two seconds. A CNN may process data corresponding to a fixed amount of time. A wakeword-detection system may further include a recurrent neural network (RNN), such as a long short-term memory (LSTM), which bases its output not only on a current input but also past outputs. The RNN may thus may also be used to process variable amounts of audio data. In some situations, the CNN and/or RNN may fail to detect a wakeword even though a user spoke it (a "false negative") or mistakenly detect a wakeword when it was not spoken (a "false positive").

Inclusion of an RNN may, however, present certain complications. The CNN and RNN may be trained using training data, which may include audio and corresponding text that represents the wakeword as uttered by a number of different speakers in a number of different volumes, styles, and tones. The training data may further include audio and/or corresponding text representing other words; these other words may be associated with the wakeword. These associated words may include commands or requests associated with a speech-processing system; examples include "play," "what is," "look up," "call," and/or "weather". The training data may further include audio and/or corresponding text representing words unassociated with a speech-processing system. Using this training data, the CNN and RNN learn to distinguish the wakeword from other words and to detect when it is spoken. Detection may be based on the presence or absence of the above-described associated words and/or unassociated words. During operation in the field, the RNN may "listen" to many other utterances that do not include the wakeword; by listening to these other utterances and storing history data corresponding to these utterances, the RNN may diverge from its original trained state. This divergence may negatively impact detection of the wakeword.

The present disclosure improves voice-controlled devices by reducing or eliminating this divergence of the RNN from its original trained state. In some embodiments, the CNN generates a number or vector representing a likelihood that one or more audio feature vectors correspond to a representation of the wakeword. This likelihood, referred to herein as a wakeword posterior, may be a number that ranges from 0.0 to 1.0, wherein 0.0 represents a near 0% chance that the feature vectors represent the wakeword, 1.0 represents a near 100% chance that the feature vectors represent the wakeword, and numbers between 0.0 and 1.0 represent varying degrees of likelihood that the feature vectors represent the wakeword. The RNN may compare this wakeword posterior to a posterior threshold, such as, for example, 0.75, and may process the output of the CNN only when the wakeword posterior is greater than or equal to the posterior threshold. The RNN thus only "listens" to the input audio when the input audio is likely to correspond to a wakeword and thus does not "learn" from non-wakeword audio.

In other embodiments, the RNN processes the output of the CNN using a plurality of instances. Each instance corresponds to executable instructions and data that correspond to a copy of the RNN using weights and node outputs as determined by the training data—e.g., each instance of the RNN is a "fresh" copy of the RNN unaffected by any utterances spoken in the field. The RNN may create a new instance every certain number of audio frames; in some embodiments, this number of audio frames corresponds to a rate of output of the CNN. For example, the CNN may generate a new output every one, two, six, or ten frames, and the RNN may create a new instance every one, two, six, or ten frames. The frequency of instance creation may be determined by available computing resources of the device 110; more frequent instance creation may lead to more accurate detection of the wakeword but may require more system resources. Each instance of the RNN may process the output of the CNN for a certain amount of time before ceasing processing; in some embodiments, this amount of time is approximately equal to an average length of time of the various items of training data. For example, if the training data includes a number of audio items that each represent an utterance of the wakeword and/or other non-wakeword speech, and the average length of these items is approximately two seconds, the RNN may process the output of the CNN with each instance for approximately two seconds before ceasing processing using that instance.

In some embodiments, the CNN is configured to process input data representing a plurality of feature vectors. Each feature vector corresponds to audio every N audio frames, wherein N may be any number but is, in some embodiments, one, two, six, or ten. A first input may have a first set of feature vectors and a second input can have a second set of feature factors, where at least one feature vector is included in both the first set and the second set. The first input may include, for example, 76 feature vectors, while the second input may also include 76 feature vectors but 70 of the feature vectors of the second input may be shared with the first input. As explained in greater detail below, when processing the second input, outputs generated using the 70 shared feature vectors are not re-computed but are shifted, using a ring buffer, from previously computed outputs of nodes.

In some embodiments, the CNN and/or RNN may also process audio data to determine one or more non-wakeword sounds, such as additional words. Based on these non-wakeword sounds, the CNN and/or RNN may determine that a wakeword should have been detected but was not (a false negative) or that the wakeword was detected but should not have been (a false positive). For example, the CNN and/or RNN may determine a likelihood that the audio data includes a representation of a wakeword; this likelihood may satisfy a condition (e.g., it may be greater than zero but less than a detection threshold). If, however, one or more non-wakeword sounds such as words that occur before and/or after the wakeword are associated with a command or request for a speech-processing system, the CNN and/or RNN may determine that the likelihood does satisfy the condition (e.g., it is greater than a threshold) and may thus determine that the audio data includes a representation of the wakeword. The CNN and/or RNN may, upon determination of the one or more associated non-wakeword sounds, add a corresponding value to the likelihood and/or lower the threshold by a corresponding amount and re-compare the likelihood and the threshold, or simply determine that the audio data includes the representation of the wakeword. Example associated non-wakeword words include "play," "search," "call," and "what is."

In some embodiments, the CNN and/or RNN may determine a likelihood that the audio data includes a representation of a wakeword; this likelihood may satisfy the detection threshold. The CNN and/or RNN may, however, continue to process the audio data and determine one or more non-wakeword sounds, such as words, that follow the representation of the wakeword. If these sounds are not associated with a command or request for a speech-processing system, however, the CNN and/or RNN may decrease the likelihood by a corresponding amount or raise the threshold before re-comparing the likelihood with the threshold. In some embodiments, an output of the CNN and/or RNN is "1" when a wakeword is detected and remains "1" while non-wakeword sounds following the wakeword correspond to a command or request. The output falls to "0" when a non-wakeword word that does not correspond to a command or request is detected. The device may send the audio data (and/or data corresponding to the audio data) to a remote system upon detection of the wakeword; if the output falls to "0" while the audio data is still being sent, the device may cease sending the audio data.

FIGS. 1A-1E illustrate how a device 110 may be used to detect a wakeword. Although the figures and discussion illustrate certain operational steps of the system in a particular order, the steps described may be performed in a different order (as well as certain steps removed or added) without departing from the intent of the disclosure. A device 110 local to a user 10 and a system 120 may communicate across the network 199. The device 110 may receive input audio 15 from a user 10 and may perform wakeword detection using the input audio 15. If a wakeword is detected, the device 110 may further send audio data representing the input audio 15 to the system 120 via the network 199. The system 120 may perform additional speech processing (e.g., ASR and NLU), using a language-specific speech-processing component, on the audio data to determine output data responsive to an utterance represented in the audio data. The device 110 may receive the output data from the system 120 and output content corresponding to the output data.

In some embodiments, with reference to FIG. 1A, the device 110 may receive (130), from at least one microphone, audio data representing an utterance. The device 110 may receive (132), from a computer memory, neural-network parameters based at least in part on training data. The device 110 may determine (134), using a first instance of a recurrent neural-network (RNN) model, a first likelihood that the audio data represents a wakeword based at least in part on initializing the first instance of the RNN model with the neural-network weights and on a first portion of the audio data. The device 110 may, in some embodiments, determine that the first wakeword-detection hypothesis does not satisfy a condition, such as a threshold. The device 110 may determine (136), using a second instance of the RNN model, a second wakeword-detection hypothesis based at least in part on initializing the second instance of the RNN model using the neural-network weights and on a second portion of the audio data. The second portion of the audio data may include part of the first portion of the audio data; that is, the first and second portions of audio data may overlap, though at least part of the first and second portions of audio data differ. The device 110 may determine (138) that the second wakeword-detection hypothesis does satisfy the condition (e.g., is greater than a threshold). The device 110 may cause (140) speech processing to be performed using the audio data.

In other embodiments, with reference to FIG. 1B, instead of or in addition to the embodiments described herein, the device 110 may receive (150), from at least one microphone, audio data representing an utterance. The device 110 may determine (152), using a convolutional neural-network (CNN) model, a first likelihood that a first portion of the audio data represents a wakeword. The device 110 may determine (154) that the first likelihood satisfies a first condition (e.g., the first likelihood is less than a posterior threshold). Based at least in part on determining that the first likelihood satisfies the first condition, the device 110 may cease (156) further processing of the first portion of the audio data. The device 110 may determine (158), using the CNN model, a second likelihood that a second portion of the audio data represents the wakeword. The device 110 may determine (160) that the second likelihood satisfies a second condition (e.g., the second likelihood is greater than the posterior threshold). Based at least in part on determining that the second likelihood satisfies the second condition, the device 110 may process (162), using a recurrent neural-network (RNN) model, the second portion of the audio data.

In other embodiments, with reference to FIG. 1C, instead of or in addition to the embodiments described herein, the device 110 may receive (170) a first plurality of audio feature vectors including at least a first audio feature vector and a second audio feature vector. The device 110 may determine (172), using a convolutional neural-network (CNN) model, a first wakeword hypothesis corresponding to a likelihood that the first plurality of audio feature vectors represents a wakeword, wherein determining the first wakeword hypothesis comprises determining node outputs of the CNN model based at least in part on the first plurality of audio feature vectors. The device 110 may receive (174) a next plurality of audio feature vectors, the next plurality of audio feature vectors including at least a subset of the first plurality of audio feature vectors. The device 110 may determine (176), using the CNN model, at least a subset of the next plurality of audio feature vectors, and at least a subset of the previously determined node outputs, a next wakeword hypothesis corresponding to a likelihood that the next plurality of audio feature vectors represents the wakeword. As additional pluralities of audio feature vectors are received, similar previously computed node outputs are similarly re-used. If further audio feature vectors are received (178), further wakeword hypotheses are determined using at least a subset of previously received audio feature vectors, as described above. If no further audio feature vectors are received, the process ends (179).

In other embodiments, with reference to FIG. 1D, the device 110 may determine (180) a probability that the audio data includes a representation of a wakeword. The device 110 may determine (182) that the probability satisfies a first wakeword detection condition (e.g., the probability is less than a threshold, indicating that the audio data does not include a representation of the wakeword). The device 110 may determine (184) that the audio data includes a representation of sound corresponding to the wakeword, such as a second word related to a command or request, a clapping or finger-snapping sound, and/or a nonverbal utterance such as a sigh. The device 110 may determine (186) that the sound is associated with the wakeword. The device 110 may therefore cause (188) speech processing to be performed using the audio data.

In other embodiments, with reference to FIG. 1E, the device may determine (190) that first audio data corresponding to a first portion of an utterance includes a representation of a wakeword. The device may begin sending (192), to a remote system, audio data corresponding to the utterance. The device may determine (194) second audio data corresponding to a second portion of the utterance includes a representation of a sound. The device may determine (196)

that the sound is unassociated with the wakeword. The device may thus cease sending (198), to the remote system, the audio data.

Referring to FIG. 2, the device 110 may receive the input audio 15 using an audio capture component, such as a microphone or array of microphones. Before performing wakeword detection (e.g., activating one or more wakeword-detection components), the device 110 may use various techniques to first determine whether the first audio data includes speech. For example, the device 110 may use a voice activity detection (VAD) component 220 to apply VAD techniques. Such VAD techniques may determine whether speech is present in the first audio data based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the VAD component 220 may be a trained classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence. Still other techniques may be used to determine whether speech is present in the first audio data. In various embodiments, the VAD component 220 consumes less power than the wakeword-detection component, which begins processing audio data (and hence consuming power) only when the VAD component determines that the audio data likely represents speech. In other embodiments, the wakeword-detection component processes all received audio data, and the VAD component 220 is not present or not used.

If the VAD component 220 determines the audio data includes speech, a wakeword-detection component 222 may activate to process the audio data to determine if a wakeword is likely represented therein. Following detection of the wakeword, the device 110 sends audio data 211, corresponding to at least an utterance following the wakeword in the audio data, to the system 120. The device 110 may further include an ASR component for determining speech represented in the input audio 15.

The wakeword-detection component 222 may process the audio data using trained models to detect a wakeword. The trained models may be CNNs, RNNs, acoustic models, hidden Markov models (HMMs), and/or classifiers. One approach for wakeword detection applies general large vocabulary continuous speech recognition (LVCSR) systems to decode the audio signals, with wakeword searching conducted in the resulting lattices or confusion networks. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component 222 may use convolutional neural network (CNN)/recursive neural network (RNN) structures directly, without using a HMM. The wakeword-detection component 222 may estimate the posteriors of wakewords with context information, either by stacking frames within a context window for a DNN, or using a RNN. Follow-on posterior threshold tuning or smoothing may be applied for decision making. Other techniques for wakeword detection may also be used.

After wakeword detection and upon receipt by the system 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech-processing component 240. The speech processing component 240 may include different components for different languages. One or more components may be selected based on determination of one or more languages. A selected ASR component 250 of the speech processing component 240 transcribes the audio data 211 into text data representing one more hypotheses representing speech contained in the audio data 211. The ASR component 250 interprets the utterance in the audio data 211 based on a similarity between the utterance and pre-established language models. For example, the ASR component 250 may compare the audio data 211 with models for sounds (e.g., subword units, such as phonemes, etc.) and sequences of sounds to identify words that match the sequence of sounds spoken in the utterance represented in the audio data 211. The ASR component 250 sends (either directly or via the orchestrator component 230) the text data generated thereby to a corresponding selected NLU component 260 of the speech processing component 240. The text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 260 attempts, based on the selected language, to make a semantic interpretation of the phrases or statements represented in the text data input thereto. That is, the NLU component 260 determines one or more meanings associated with the phrases or statements represented in the text data based on individual words represented in the text data. The NLU component 260 determines an intent (e.g., a system action that a user desires the system to perform) representative of text data as well as pertinent pieces of information in the text data that allow a device (e.g., the device 110, the system 120, etc.) to execute the intent. For example, if the text data corresponds to "play Africa by Toto," the NLU component 1060 may determine a user intended the system to output the song Africa performed by the band Toto, which the NLU component 260 determines is represented by a <PlayMusic> intent.

The orchestrator component 230 (or another component of the system 120) may send NLU results data to a speechlet component 290 associated with the intent. The speechlet component 290 determines output data based on the NLU results data. For example, if the NLU results data includes intent data corresponding to <PlayMusic> and tagged text corresponding to <Artist: Toto>, the orchestrator 230 (or other component of the system 120) may send the NLU results data to a music speechlet component, which determines Toto music audio data for output by the system.

A "speechlet" may be software running on the system 120 that is akin to an application. That is, a speechlet may enable the system 120 to execute specific functionality in order to provide data or produce some other output requested by the user 10. The system 120 may be configured with more than one speechlet. For example, a weather speechlet may enable the system 120 to provide weather information, a ride-sharing speechlet may enable the system 120 to book a trip with respect to a taxi or ride sharing service, and a food-order speechlet may enable the system 120 to order a pizza with respect to a restaurant's online ordering system.

In some instances, a speechlet 290 may provide output text data responsive to received NLU results data. The system 120 may include a text-to-speech (TTS) component 280 that generates output audio data from speechlet provided output text data. The TTS component 280 may use different synthesis techniques. In one method of synthesis, called unit selection, the TTS component 280 analyzes text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder. In another method of speech synthesis, a trained model called a sequence-to-sequence model directly generates output audio data based on the input text data.

The system 120 may include a user-recognition component 295. The user-recognition component 295 may receive the audio data 211 and/or text data output by the ASR component 250. The user-recognition component 295 may determine scores indicating whether the speech represented in the audio data 211 originated from a particular user. For example, a first score may indicate a likelihood that the speech originated from a first user and a second score may indicate a likelihood that the speech originated from a second user. The user-recognition component 295 may also determine an overall confidence regarding the accuracy of user recognition operations. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.) received by the system in correlation with the audio 15 to stored biometric data of users. The user-recognition component 295 may further perform user recognition by comparing image data (e.g., including a representation of at least a feature of a user) received by the system in correlation with the audio 15 with stored image data (e.g., including representations of features of users). The user-recognition component 295 may perform additional user recognition processes. Output of the user-recognition component 295 may be used to inform NLU processing as well as processing performed by speechlets 290.

The system 120 may include a user-profile storage 270. The user profile storage 270 may include a variety of information related to individual users and/or groups of users that interact with the system 120. The user-profile storage 270 may include one or more user profiles. Each user profile may be associated with a different user ID. A user profile may be an umbrella profile specific to one or a group of users. That is, a user profile may encompass two or more individual user profiles, each associated with a respective user ID. For example, a user profile may be a household profile that encompasses user profiles associated with multiple users of a single household. A user profile may include preferences shared by all the user profiles encompassed thereby. Each user profile encompassed under a single user profile may include preferences specific to the user associated therewith. That is, each user profile may include preferences unique from one or more other user profiles encompassed by the same user profile. A user profile may be a stand-alone profile or may be encompassed under another user profile. As illustrated, the user profile storage 270 is implemented as part of the system 120. The user profile storage 270 may, however, may be disposed in a different system in communication with the system 120, for example over the network 199. User-profile data may be used to inform NLU processing as well as processing performed by a speechlet 290.

As described above, the wakeword-detection component 222 may implement device specific and/or user specific machine learned models. One or more machine learned models may, however, be trained using both device specific speech-processing data and user specific speech processing data. The more data types used to train a machine learning model, the more accurate a resulting trained model may be in predicting whether the wakeword detection sensitivity should be lowered. For example, other data that may be used to train a machine learning model includes a type of the device 110 or a location of the device 110 (e.g., a geographic location or a location with a building).

Users may speak a first wakeword followed by a first command to a device and thereafter speak a second wakeword followed by a second command to the device. Moreover, an intent of the first command may indicate to the system that the device is likely to receive the second wakeword and second command. For example, a user may routinely say "Alexa, play [artist name]," with "Alexa" corresponding to a first wakeword and "play [artist name]" corresponding to a <PlayMusic> intent. After a user speaks such, it may that the user says "Alexa, [increase or decrease] the volume," with "Alexa" corresponding to a second wakeword and "play [increase or decrease] the volume" corresponding to a <ChangeVolume> intent. Because the user routinely speaks the command corresponding to the <ChangeVolume> intent after the user speaks the command corresponding to the <PlayMusic> intent, the system 120 may infer that the wakeword detection sensitivity should be lowered when the system determines a command corresponding to a <PlayMusic> intent.

In some implementations, the system 120 may receive input audio data from the device 110 as well as receive indications from the device 110 that the device 110 detected a wakeword and that the wakeword corresponds to a language. The system 120 may perform processes to confirm that the wakeword is present in the input audio data using a model trained using data accessible to the system 120. This may be beneficial if the device 110 performs unreliable wakeword detection or, at least, less-reliable wakeword detection than the system 120.

The aforementioned models and other models described herein may be trained and operated according to various machine-learning techniques. Such techniques may include, for example, neural networks (such as convolutional neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine-learning techniques, machine learning processes themselves need to be trained. Training a machine learning component may include establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. During training, the training data may be applied to a model and the output of the model may be evaluated for its accuracy in producing the expected output specified by the training data. The model may be updated in accordance with, for example, a gradient-descent algorithm, in which one or more weights of the model are back filled.

The user profile storage 270 includes data regarding individual user profiles. Each user profile may include information indicating various devices, output capabilities of each of the various devices, and/or a location of each of the various devices. The device-profile data represents a profile specific to a device. For example, device profile data may represent various user profiles that are associated with the device, speech processing that was performed with respect to audio data received from the device, instances when the device detected a wakeword, etc. In contrast, user-profile data represents a profile specific to a user.

Figure 3:
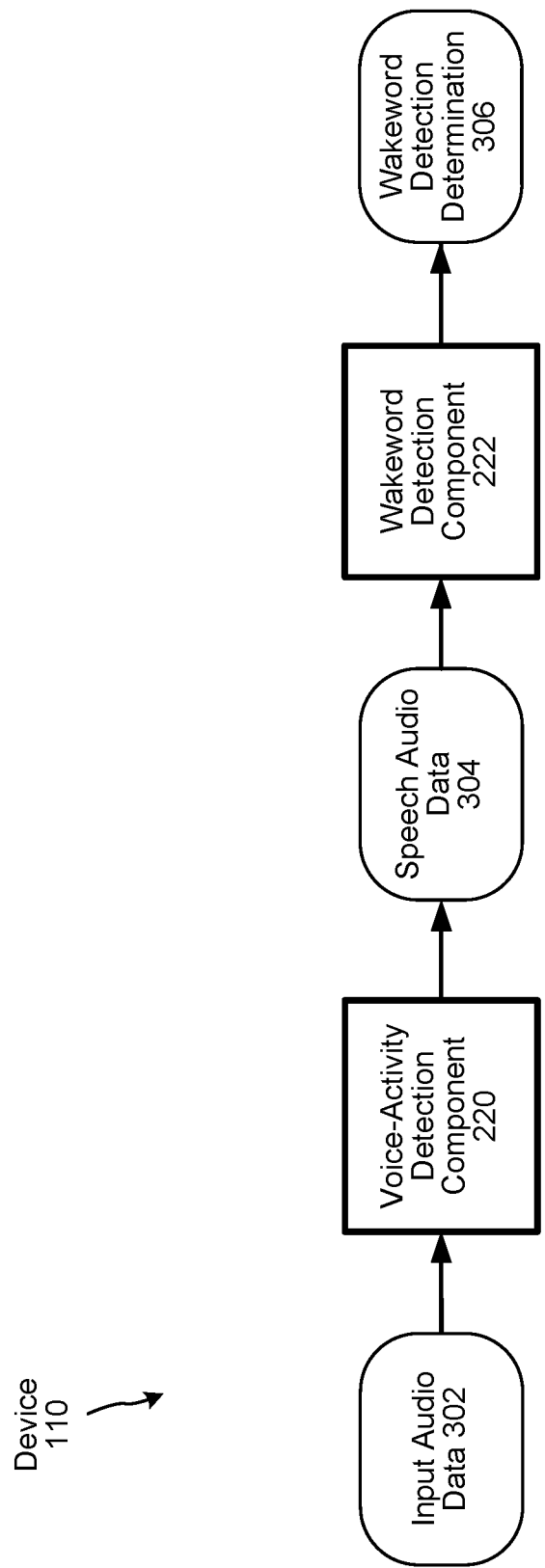
FIG. 3 illustrates a device for detecting a wakeword in accordance with embodiments of the present disclosure.

FIG. 3 illustrates components of the device 110 in accordance with the present disclosure, of which further disclosure is provided later figures. In various embodiments, the device 110 receives input audio data 302 that potentially represents an utterance by the user 10 and which may also represent a wakeword. The input audio data 302 may be digital data that represents a time-domain or frequency-domain audio signal. In other embodiments, the input audio data 302 is data that has been processed using, for example, an acoustic model, and represents acoustic units and/or audio features of the digital data.

The VAD component 220 may receive and process the input audio data 302 using the techniques described above. In accordance with those techniques, the VAD component 220 may determine that the input audio data 302 likely includes a representation of speech. If this determination is made, the VAD component 220 may send corresponding speech-related audio data, referred to herein as speech audio data 304, to the wakeword-detection component 222. As noted above, however, in some embodiments, the device 110 does not include and/or does not use the VAD component 220; in these embodiments, the wakeword-detection component 222 processes the input audio data 302 continually and not only when the VAD component 220 determines that the input audio data 302 likely includes a representation of speech. As discussed in greater detail herein, the wakeword-detection component 222 outputs a wakeword-detection determination 306, which may be a yes/no indication of whether the input audio data 302 includes representation of the wakeword. If the wakeword-detection determination 306 corresponds to "yes," the device 110 may send data representing the utterance (which may be the input audio data 302 and/or other data representing the utterance) to the system 120.

Figure 4:
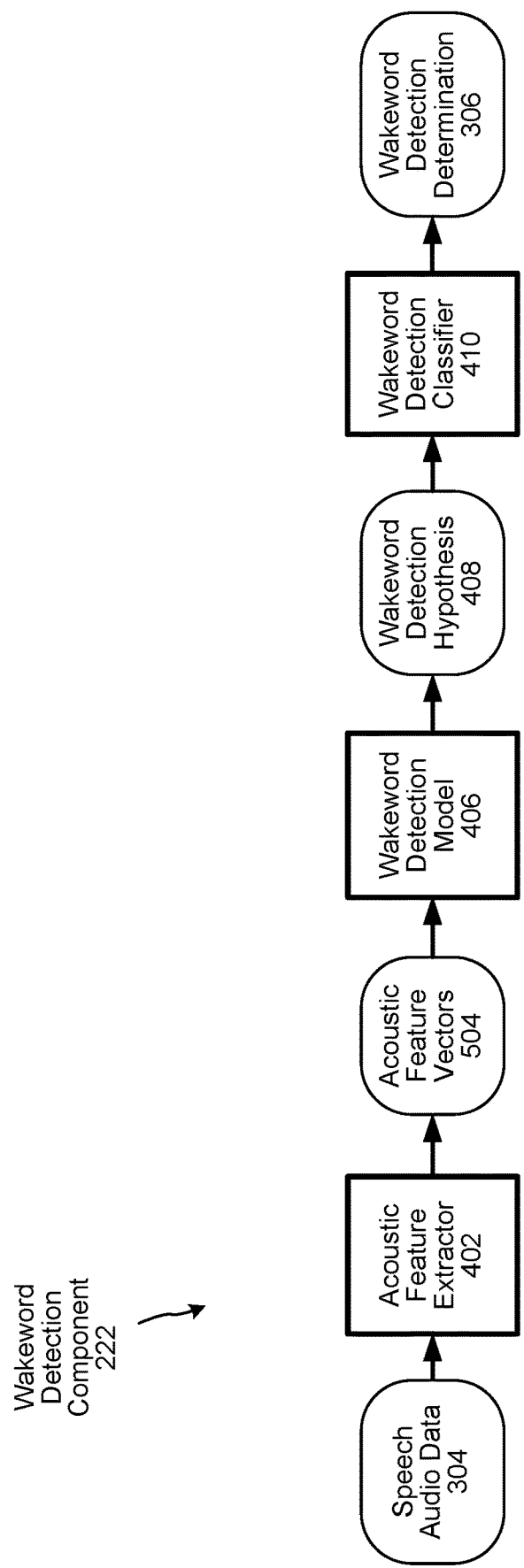
FIG. 4 illustrates a wakeword-detection component in accordance with embodiments of the present disclosure.

FIG. 4 illustrates embodiments of the wakeword-detection component 222. The wakeword-detection component 222 may first process the speech audio data 304 using an acoustic feature extractor 402. The acoustic feature extractor 402 may be a convolutional neural network (CNN) and/or a recurrent neural network (RNN). The acoustic feature extractor 402 may generate acoustic feature vectors 404 based on the speech audio data 304. The acoustic feature vectors 404 may each be a vector of floating-point numbers that each indicate one or more acoustic features related to the speech audio data 304, such as volume, pitch, frequency, cadence, intonation, and/or changes over time of these features. The acoustic feature vectors 404 may further include audio features related to language-specific aspects of the speech audio data 304, such as language-specific consonant and vowel sounds. The acoustic feature extractor 402 may be trained using training data, which may include audio data representing the wakeword being spoken in a plurality of languages and annotations indicating in which language each wakeword is spoken. The acoustic feature vectors 404 may be a vector of numbers; the dimension of the vector (e.g., the size of the vector) may be, for example, 100-500. The speech audio data 304 may be divided into audio frames, in which each audio frame represents a discrete amount of time of audio, such as 10 milliseconds. A new acoustic feature vector 404 may be generated for each audio frame or for a group of audio frames.

The audio feature vectors 404 may track a certain number of dimensions worth of feature data for each time unit. The resolution of each time unit for the audio feature vectors 404 may not necessarily be the same as the original speech audio data 304. For example, one time unit of the audio feature vectors 404 may correspond to a longer time duration than an original audio frame (which may be the time unit for speech audio data 304). Thus, there may not be a one-to-one relationship between a unit of speech audio data 304 and a vector of the audio feature vectors 404. For example, one vector of the audio feature vectors 404 may correspond to eight audio data frames, four audio data frames, or a different time unit that does not correspond to an integer number of audio frames—various such time units are possible using the system. Thus each vector of the audio feature vectors 404 may include data corresponding to many different original audio data frames. The time resolution may depend on system configuration. The audio feature vectors 404 may be data in a time domain or frequency domain, may include binned data according to frequency ranges or time ranges, may include different configurations of features, etc. Configuration of the audio feature vectors 404 may also depend on configuration of the audio feature extractor 402.

The audio feature vectors 404 may correspond to one or more values in feature dimensions that may be used by other models in performing further operations. The audio feature vectors 404 may include values that represent features of the audio, such as timber, pitch, volume, or other such values. The audio feature vectors 404 may further include values that represent features of the audio that do not correspond directly to these features. In certain instances, the audio feature extractor 402 may be trained using a classifier so that the feature extractor 804 learns the feature data most useful to the later operations.

To produce the audio feature vectors 404, the feature extractor 402 may be configured as a CRNN. A residual network structure may be used as the convolutional network in the feature extractor CRNN, which may include two convolutional blocks. The feature extractor CRNN may include a number of layers. A bottom convolutional layer may input the audio data 802 and with a stride of (2,1) (meaning the layer may skip an output every two timestamps). The CRNN then may have a max pooling layer with a stride of (2,2) resulting in a 2× time dimensionality reduction and a 2× frequency reduction. The result of the max pooling is then processed by the next two convolutional blocks/residual network blocks (e.g., Conv 3×3, 64), the output of which is then processed by the next two convolutional blocks (Conv 3×3, 128). An average pooling block may then be used to further reduce the dimensionality before feeding into a bi-directional gated recurrent unit (GRU) layer to produce the audio feature data 806. The audio feature vectors 404 may have a time scale of 186 milliseconds, e.g., eight times the resolution of an input spectrogram. The number of units in the feature data may correspond to the number of units in the bi-directional GRU layer of the CRNN.

A wakeword-detection model 406 may receive the acoustic feature vectors 404 and, based thereon, determine a wakeword-detection hypothesis 408, which may be one or more numbers indicating a likelihood that the acoustic feature vectors 404 represent the wakeword. Like the wakeword posterior described above, the wakeword detection hypothesis 408 may be a number that ranges from 0.0 to 1.0, wherein 0.0 represents a 0% chance that the feature vectors represent the wakeword, 1.0 represents a 100% chance that the feature vectors represent the wakeword, and numbers between 0.0 and 1.0 represent varying degrees of likelihood that the feature vectors represent the wakeword. A value of 0.75, for example, may correspond to 75% confidence in the audio feature data 404 including a representation of the wakeword. The wakeword hypothesis 512 may further include a confidence value over time and may indicate at which times in the audio feature data 404 that the wakeword is more or less likely to be represented. The wakeword-detection model 406 is discussed in greater detail below.

In some embodiments, if the wakeword-detection hypothesis 408 satisfies a detection condition, the device 110 sends the audio data 304 to the system 120. If, for example, the wakeword-detection hypothesis 408 satisfies a condition (e.g., it is greater than a detection threshold, such as 0.75), the device 110 sends the audio data 304. The condition (e.g., detection threshold) may be determined based on training data and/or experimentation. In other embodiments, however, a second-stage wakeword-detection classifier 410 further processes the wakeword-detection hypothesis 408, speech audio data 304, and/or acoustic feature vectors 406 to determine if the speech audio data 304 includes a representation of the wakeword and outputs the wakeword-detection determination 306. The wakeword-detection classifier 410 may thus be referred to as a second-stage classifier. The wakeword-detection classifier 410 may be a CNN or RNN. The wakeword-detection classifier 410 may differ from the wakeword-detection model 406 in type, size, number of layers, and/or number of nodes. In some embodiments, the wakeword-detection classifier 410 is further trained using different training data; for example, wakeword-detection classifier 410 may be trained using only or mostly positive utterances of the wakeword (e.g., utterances that include only the wakeword) and not negative utterances of the wakeword (e.g., utterances that do not include the wakeword or include both the wakeword and non-wakeword speech). In some embodiments, the wakeword-detection classifier 410 includes a posterior-smoothing component to remove or reduce spikes and other quickly changing transient effects in the wakeword-detection hypothesis 408. The posterior-smoothing component may be a filter, such as a finite-impulse response (FIR) filter, or a trained model, such as a CNN or RNN.

FIG. 5 illustrates an embodiment of the wakeword-detection model 406. A CNN model 502 receives the acoustic feature vectors 404 and processes them to create encoded feature vectors 504 and the wakeword posterior 506. The encoded feature vectors 504 may correspond to encoded or embedded versions of the audio feature vectors 404 and may represent higher-level audio features, such as mood or tone, and may encode features corresponding to a plurality of acoustic feature vectors 404. The CNN model 502 may include a number of nodes arraigned in one or more layers. Each node may be a computational unit that has one or more weighted input connections, a transfer function that combines the inputs in some way, and an output connection. The CNN model 502 may perform a convolution operation using the acoustic feature vectors 404; the CNN model 502 may further perform a rectification function using, for example, a rectified linear unit (ReLu) to increase non-linearity of the CNN model 502, may perform a pooling operation to reduce or eliminate effects of variation in pronunciation of the wakeword, and/or may perform a flattening function to combine a matrix of values into a single vector, such as one of the encoded feature vector 504.

The wakeword-detection model 406 further includes an RNN model 508 which may, as described above, be an LSTM. As described in greater detail below, the RNN model 508 may process the encoded feature vector 504 only when the wakeword posterior 506 satisfies a condition (e.g., it is greater than a posterior threshold). The RNN model 508 may further process the encoded feature vector 504 using a plurality of instances of the RNN model 508; in some embodiments, the RNN model 508 creates a new instance only when the wakeword posterior satisfies the condition (e.g., it is greater than the posterior threshold). The RNN model is discussed in greater detail below with reference to FIGS. 7A and 7B.

Figure 6A:
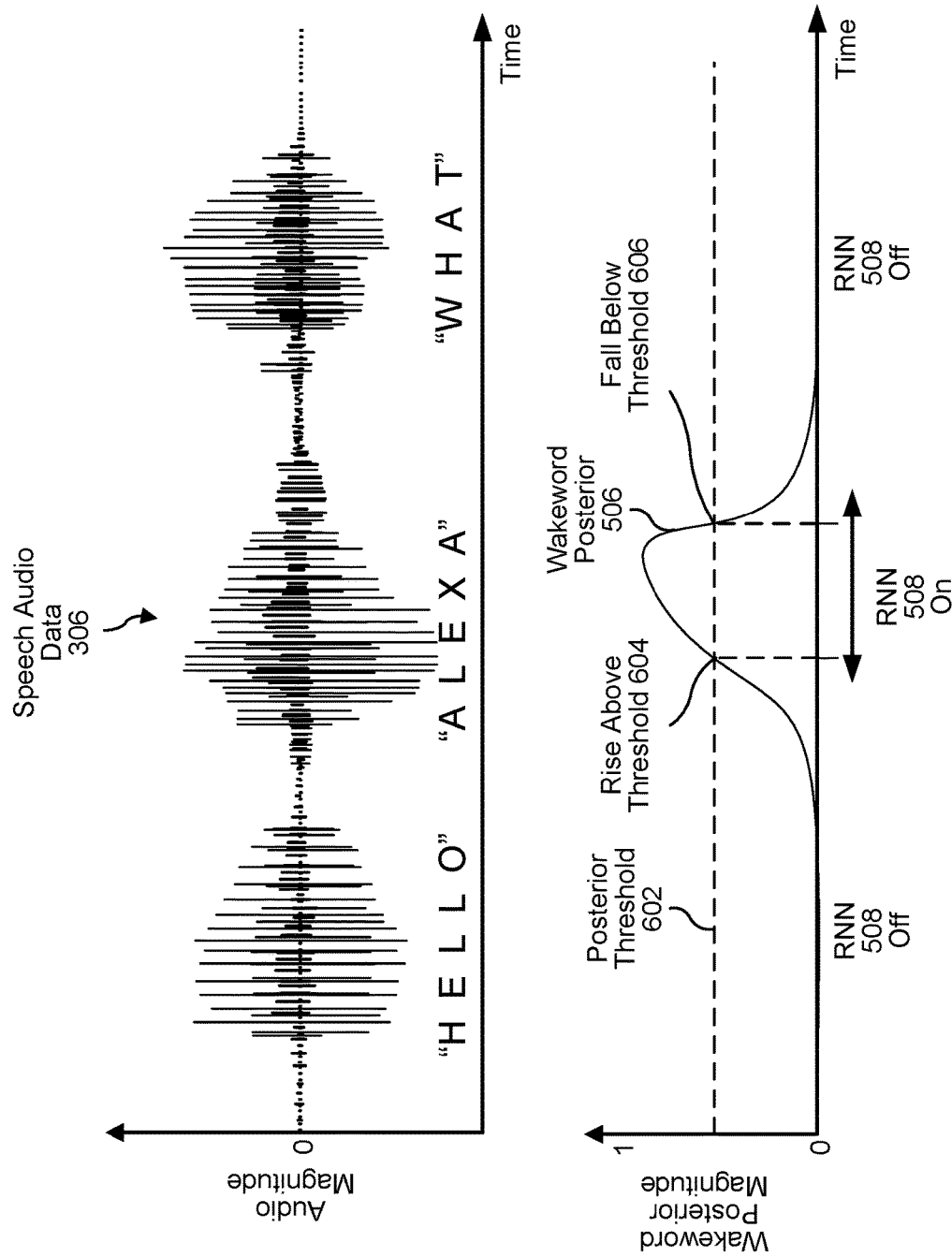
FIG. 6A illustrates a system using a wakeword-posterior threshold in accordance with embodiments of the present disclosure.

FIG. 6A illustrates how the RNN model 508 may process or not process the output of the CNN 502 (e.g., the encoded feature vector 504) depending on a value of the wakeword posterior 506 satisfying a condition (e.g., being above or below a posterior threshold 602). As one example, the speech audio data 306 includes a representation of the utterance "Hello Alexa, what is the time?" As the CNN model 502 processes audio feature vectors 404 corresponding to the portions of the speech audio data 306 that includes the representations of "Hello" and "what" (e.g., non-wakeword speech), the wakeword posterior 506 is below the posterior threshold 602. When, however, the CNN model 502 processes audio feature vectors 404 corresponding to the portion of the speech audio data 306 that includes the representation "Alexa" (e.g., the wakeword), the wakeword posterior 506 is above the posterior threshold 602. The RNN model 508 may thus process the encoded feature vectors 504 corresponding to a first time 604 of the wakeword posterior 506 rising above the posterior threshold 602 and a second time 606 of the wakeword posterior 506 falling below the posterior threshold 602. The processed encoded feature vectors 504 may correspond to a beginning time that is before the first time 604 and to an ending time that is after the second time 604. For example, if the first time 604 occurs at 1000 milliseconds and the second time 606 occurs at 2000 milliseconds, the processed encoded feature vectors 504 may correspond to a time between 500 milliseconds and 2500 milliseconds. In some embodiments, in addition, the RNN model 508 periodically "resets" by reverting back to node weights and/or values determined by the training data. This periodic resetting may occur every hour, day, or month, for example. In other embodiments, the RNN model 508 resets when a wakeword-detection accuracy falls below an accuracy threshold. The system 120 may determine the wakeword-detection accuracy by, for example, determining that the device 110 detected the wakeword but then determining that the speech audio data 306 does not include the wakeword using, for example, a larger, more accurate wakeword-detection component.

Figure 6B:
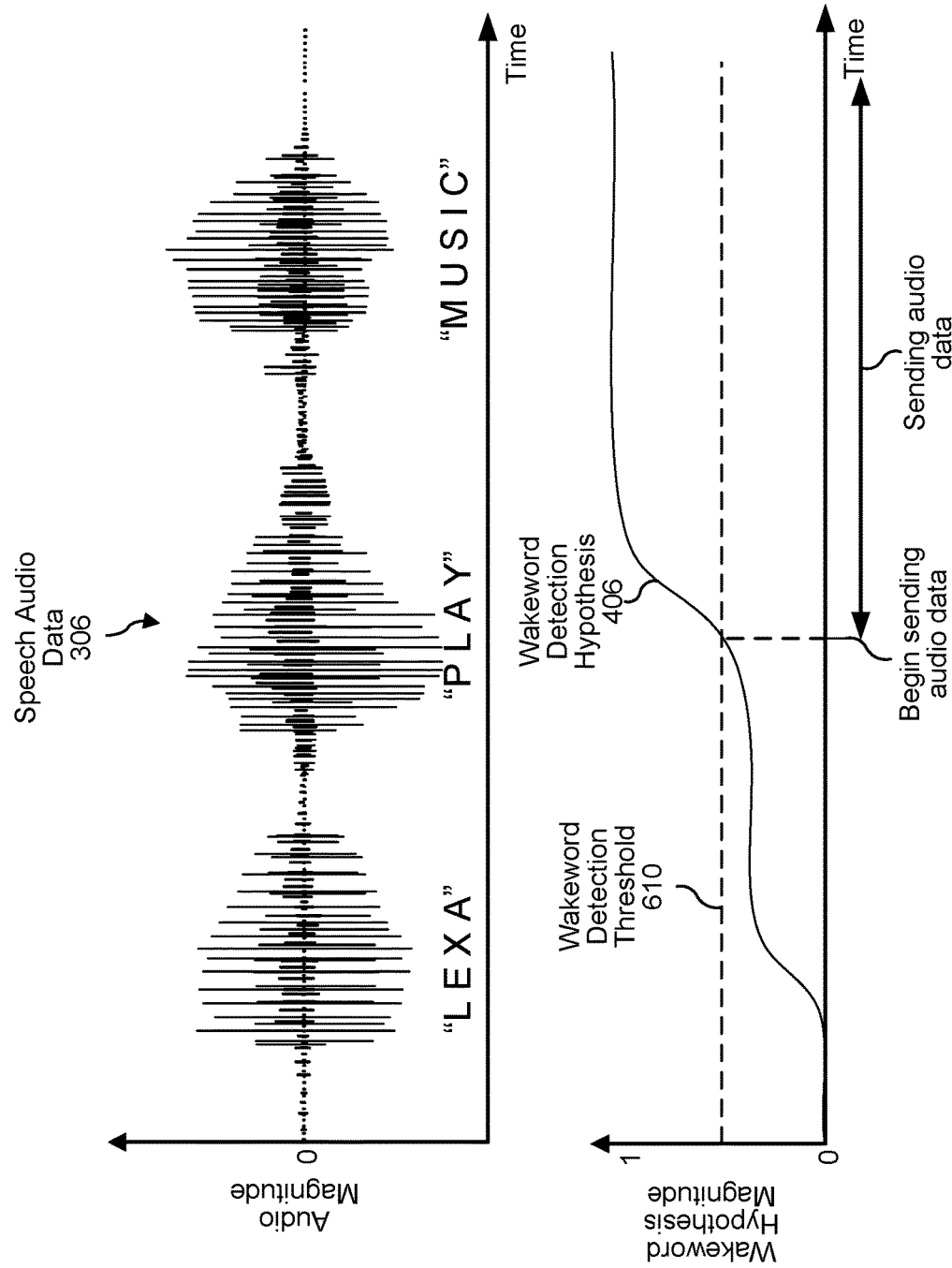

FIG. 6B illustrates how the device 110 may erroneously determine that a wakeword is not represented by the audio data 306 (a false negative) and then determine that a wakeword is represented in audio data 306 based on detection of one or more non-wakeword sounds, such as words, associated with a command or request represented in the audio data 306. The audio data 306 may, for example, include representations of a mispronunciation of the wakeword, other speech or noise occurring during utterance of the wakeword, or a too-quiet representation of the wakeword. The wakeword detection hypothesis 406 corresponding to the portion of the audio data 306 representing the wakeword may thus be less than a wakeword detection threshold 610. For example, with reference to FIG. 6B, if the wakeword is "Alexa," the audio data may include a representation of a word "Lexa." This representation may be caused by omission of the first syllable in the utterance (e.g., mispronunciation); cross-talk or other noise during utterance of the first syllable; and/or utterance of the first syllable being too quiet. As a result, the device 110 does not determine that portion of the audio data 306 includes a representation of the wakeword and accordingly does not send, while that portion of the audio is received, the audio data 306 to the system 120.

Because, however, a later-detected non-wakeword sound associated with a command or query may be determined to be represented in the audio data 306, the wakeword detection hypothesis 406 may increase past the threshold 610, and the device 110 accordingly may send corresponding data to the system 120. For example, if the audio data 306 includes a representation of the command, "Lexa, play music," the CNN model 502 and/or RNN model 508 may determine a wakeword detection hypothesis 406 that does not rise above the threshold 610 during the "Lexa" portion of the command but may determine a wakeword detection hypothesis 406 that does rise above the threshold 610 during the "play music" portion of the command. The device 110 may send the audio data 306 to the system 120 when the wakeword detection hypothesis 406 increases past the threshold 610. The device 110 may cease sending the audio data 306 when the command is complete by, for example, determining that the utterance has ended. The CNN model 502 and/or RNN model 508 may process the audio data 306 for an amount of time after the portion of the audio data 306 that includes the representation of the wakeword; this amount of time may be, for example 1-2 seconds.

FIG. 6C illustrates how the device 110 may erroneously determine that the wakeword is represented in the audio data 306 (a false positive) and then determine that a wakeword is not represented in the audio data 306 based on detection of one or more non-wakeword sounds unassociated with a command or request represented in the audio data. The audio data 306 may, for example, include a representation of sounds that resemble the wakeword but are in fact non-wakeword words or other sounds. For example, the device 110 may receive audio data 306 that includes a representation of the phrase, "Alec's a fast runner," meaning that the speaker of the utterance regards a person known as Alec as a fast runner. The first part of the phrase, "Alec's a," however, resembles the sounds of the wakeword "Alexa." Because of this resemblance, the CNN model 502 and/or RNN model 508 outputs a wakeword detection hypothesis 406 that is greater than a wakeword detection threshold 610 while processing the audio data 306 that corresponds to the representation of "Alec's a." The next word of the utterance, "fast," however, is a non-wakeword word that is unassociated with a command or request. Because the non-wakeword word "fast" is unassociated, the CNN model 502 and/or RNN model 508 outputs a wakeword detection hypothesis 406 that falls below the wakeword detection threshold 610 during processing of the portion of the audio data 306 that corresponds to the non-wakeword word "fast." The CNN model 502 and/or RNN model 508 may process the audio data 306 for an amount of time after the portion of the audio data 306 that includes the representation of the wakeword; this amount of time may be, for example 1-2 seconds.

The device 110 may send, to a remote system 120, the audio data 306 when the wakeword detection hypothesis 406 rises above the wakeword detection threshold 610. The device 110 may continue to send the audio data 306 as it is generated from the rest of the utterance. When, however, the CNN model 502 and/or RNN model 508 outputs a wakeword detection hypothesis 406 that falls below the wakeword detection threshold 610, the device 110 may cease sending the audio data 306 to the remote system 120.

The remote system 120 may, upon receipt of the beginning of the audio data 306, perform a verification operation to verify that the audio data 306 includes the representation of the wakeword. The remote system 120 may include a neural-network model configured as a classifier that receives a portion of the audio data 306 as input and makes a yes-or-no determination regarding the presence of the representation of the wakeword. The portion of the audio data 306 may be approximately two seconds long. The portion of the audio data 306 may begin at a point in time prior to the representation of the wakeword; in some embodiments, 500 milliseconds prior to the representation of the wakeword. If the classifier determines that the wakeword is not represented in the audio data 306, and if the device 110 is still sending further audio data, the remote system 120 may send, to the device 110, a command to cease sending the audio data.

The CNN model 502 and/or RNN model 508 may be trained to detect false positives, false negatives, or both false positives and false negatives. The training data may include a number of audio samples that represent the wakeword and a number of common non-wakeword words associated with a command or request. For example, the training data may include first audio data that represents the utterance "Alexa, play"; second audio data that represents the utterance "Alexa, what is," third audio data that represents the utterance "Alexa, call." The training data may further include audio data that represents just the wakeword or just the non-wakeword words.

FIGS. 7A and 7B illustrate a wakeword-detection model 700 that includes instances 508a, 508b, . . . , 508N of the RNN model 508 in accordance with embodiments of the present disclosure. As described above, each instance 508a, 508b, . . . , 508N may be a copy of the RNN model 508 configured to process the encoded feature vectors 504 using identical model parameters (e.g., node weights and/or node output values) as determined by training data and not, for example, influenced or otherwise determined by previous encoded feature vectors 504. Each instance 508a, 508b, . . . , 508N may be initialized using the model parameters before processing the encoded feature vectors 504.

Each instance 508a, 508b, . . . , 508N may output a corresponding wakeword-detection hypothesis 406a, 406b, . . . , 406N. Each wakeword-detection hypothesis 406a, 406b, . . . , 406N may indicate a likelihood that a corresponding instance 508a, 508b, . . . , 508N determined that the encoded feature vectors 504 include a representation of the wakeword. If one or more wakeword-detection hypotheses 406a, 406b, . . . , 406N indicate the wakeword, the device 110 may send corresponding audio data to the system 120.

FIG. 7B illustrates how the instances 508a, 508b, . . . , 508N process the encoded feature vectors 504. In this example, each instance 508a, 508b, . . . , 508N processes encoded feature vectors 504 corresponding to three frames of audio data, and each new instance 508a, 508b, 508N begins processing additional encoded feature vectors 504 every two frames. The present disclosure is not limited to only these values, however, and any size and frequency for the instances 508a, 508b, . . . , 508N processing the encoded feature vectors 504 is within its scope. In some embodiments, for example, each instance 508a, 508b, . . . , 508N processes encoded feature vectors 504 corresponding to 200 frames of audio data (e.g., two seconds of audio data), and each instance 508a, 508b, . . . , 508N begins processing additional encoded feature vectors 504 every six frames. Thus, up to 33 instances 508a, 508b, . . . , 508N may be processing the encoded feature vectors 504 at the same time; when an oldest instance 508a ceases processing the encoded feature vectors 504 (after, e.g., two seconds or 200 frames), a new instance 508N is created. The oldest instance 508a may cease processing the encoded feature vectors 504 when a number of groups of the encoded feature vectors 504 reaches a vector threshold (e.g., 33). In other embodiments, each instance 508a, 508b, . . . , 508N begins processing additional encoded feature vectors 504 every one, two, or ten frames.

Figure 8:
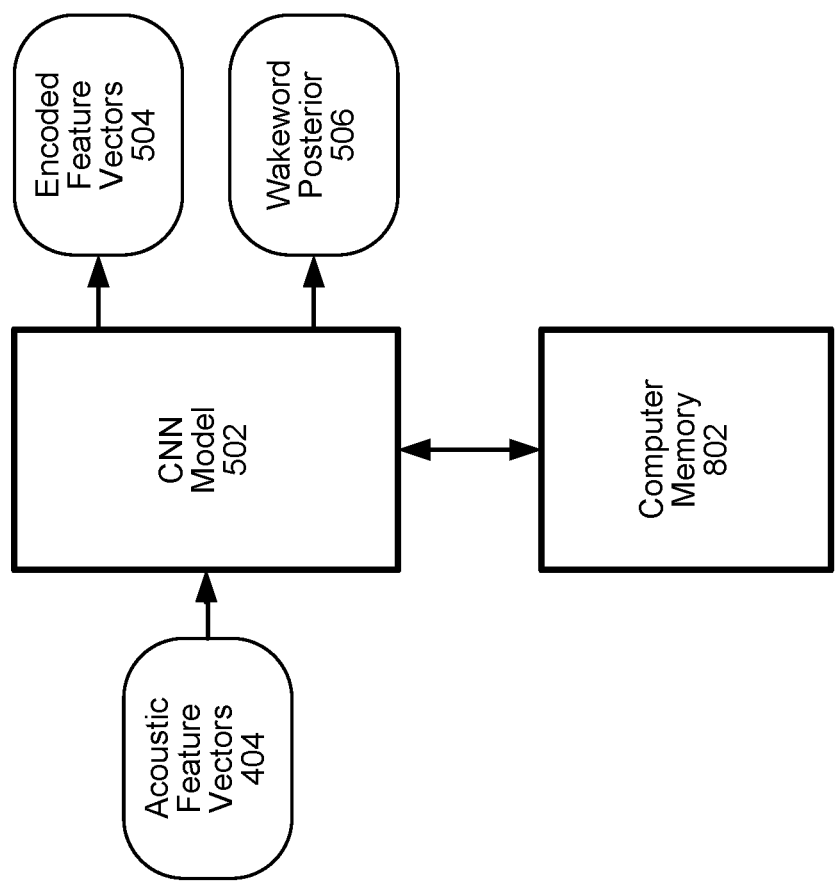
FIG. 8 illustrates a system using a computer memory to store node results in accordance with embodiments of the present disclosure.

FIG. 8 illustrates a CNN model 502 that may store some or all of the outputs of some or all of its nodes in a computer memory 802. The CNN model 502 may include a number of nodes arranged in a number of layers; the nodes for each layer, however, may be identical and may perform the same operation as each other node in the layer. As explained in greater detail below, not every node need be re-computed every time a new input of acoustic feature vectors 404 is processed by the CNN model 502, and the CNN model 502 may re-use node outputs previously computed for earlier inputs.

FIG. 9A illustrates an example of the acoustic feature vectors 404 and corresponding CNN inputs 902, 904, 906, 908. A first CNN input 902 corresponds to eight frames of acoustic feature vectors 1-8; a second CNN input 904 corresponds to eight frames of acoustic feature vectors 3-10; a third CNN input 906 corresponds to eight frames of acoustic feature vectors 5-12; and a fourth CNN input 908 corresponds to eight frames of acoustic feature vectors 7-14. The CNN inputs 902, 904, 906, 908 thus correspond to new inputs every two frames. The present disclosure is not, however, limited to only these sizes and frequencies of inputs, and any size and frequency is within its scope. In some embodiments, for example, the CNN inputs correspond to a size of 76 frames every 6 frames. Notably, CNN input 1 902 and CNN input 2 904 overlap in frames 3-8 in a first region 912; CNN input 2 904 and CNN input 3 906 overlap in frames 5-10 in a second region 914; and CNN input 3 906 and CNN input 4 908 overlap in frames 7-12 in a third region 916. Other sizes and frequencies of CNN inputs may have corresponding regions of overlap.

Figure 9B:
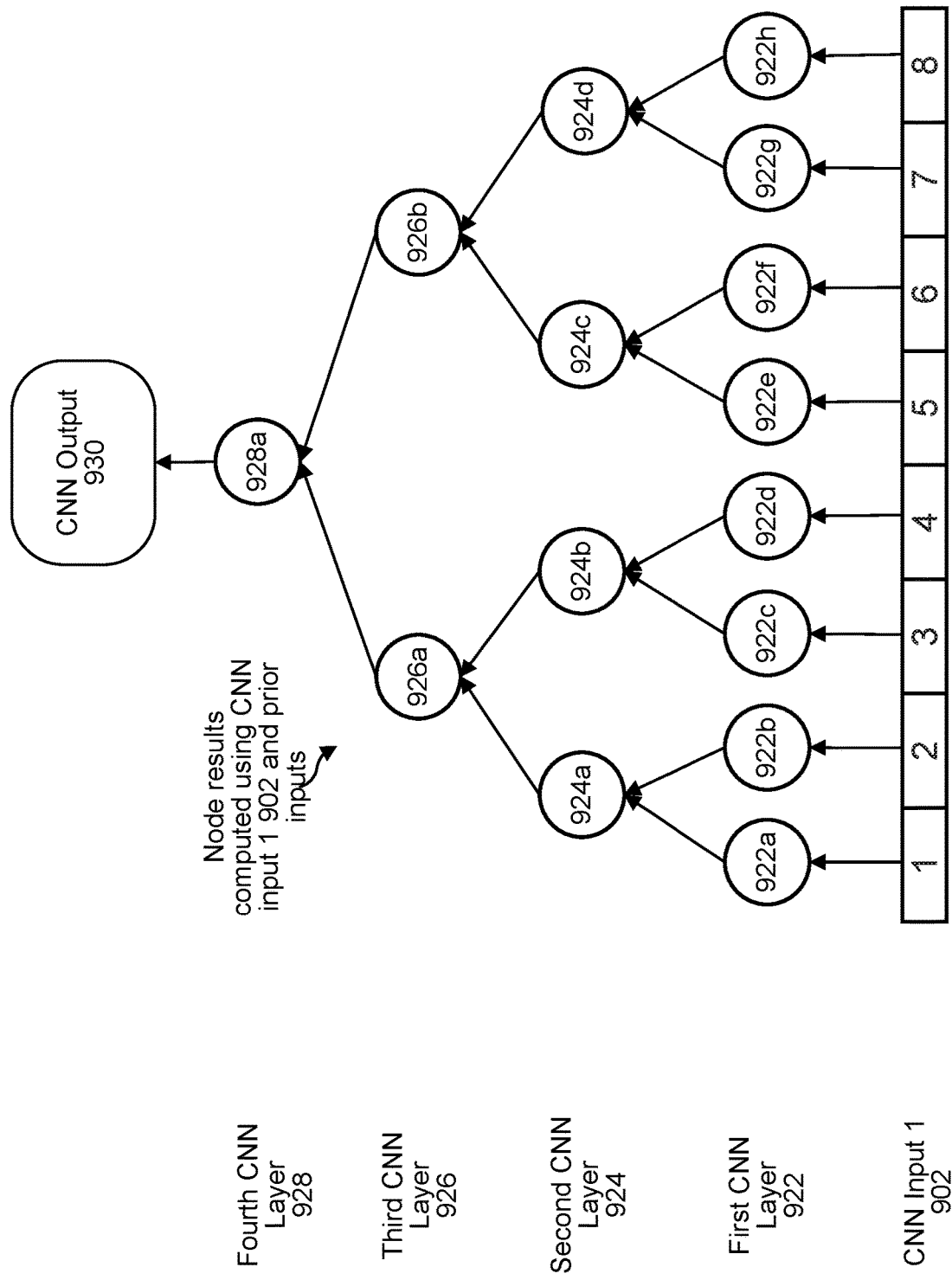

FIG. 9B illustrates a configuration of the CNN model 502 after receiving the first CNN input 902. The CNN model 502 may have any number of nodes, connections between nodes, and layers, and is not limited to only the nodes, connections between nodes, and layers depicted in FIG. 9B. Outputs of nodes in a first layer 922 are computed using the first CNN input 902; outputs of nodes in higher layers 924, 926, 928 may be computed using prior inputs. For example, the output of a first node 922a in the first layer 922 is computed using a first frame of the CNN input 902, the output of a second node 922b in the first layer 922 is computed using a second frame of the CNN input 902, and so on. The node outputs may be used to determine a CNN output 930, which may be a wakeword posterior, encoded feature vector, or other output. As mentioned, the node outputs may be stored in the computer memory 802. This computer memory 802 may be, in some embodiments, a ring buffer.

FIG. 9C illustrates a configuration of the CNN model 502 after receiving the second CNN input 904. As mentioned, CNN input 1 902 and CNN input 2 904 overlap in a first region 912. Because the CNN model 502 already processed the frames 3-8 in this region 912 when the first CNN input 902 was received, and because the outputs 922c-922h of the corresponding nodes in the first layer 922 were stored in the computer memory 802, the outputs of these nodes may be loaded from the computer memory 802. The outputs 922i, 922j of the last two nodes of the first layer 922, the output 924e of the last node of the second layer 924, the output 926c of the last node of third layer 926, and the output 928b of the fourth layer 928 may be re-computed with the previously unseen last two feature vectors of the CNN input 2 904—which correspond to frames 9 and 10—and may be computed and stored in the computer memory 802. Thus, as illustrated, outputs of nodes in the first layer 922, second layer 924, and third layer 926 are shifted left.

Figure 9D:
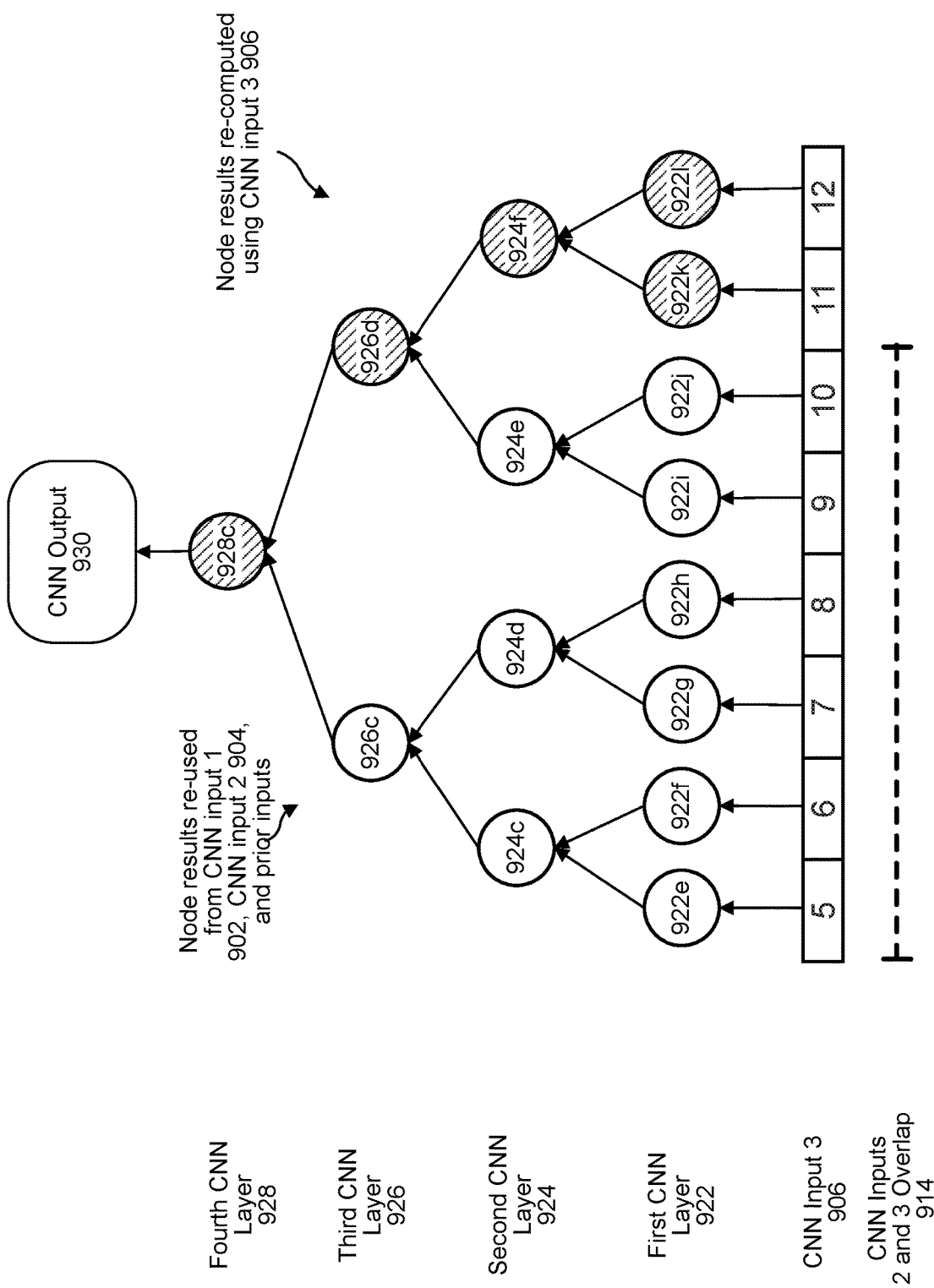

FIG. 9D illustrates a configuration of the CNN model 502 after receiving the third CNN input 906. As before, outputs 922e-922j of the first layer 922, outputs 924c-924e of the second layer 924, and output 926c of the third layer 926 are shifted left, and the two rightmost outputs 922k, 922l of the first layer, the output 924f of the last node of the second layer 924, the output 926d of the last node of third layer 926, and the output 928c of the fourth layer 928 are re-computed using the new frames 11 and 12, while the rest of the outputs are loaded from the computer memory 802.

Figure 9E:
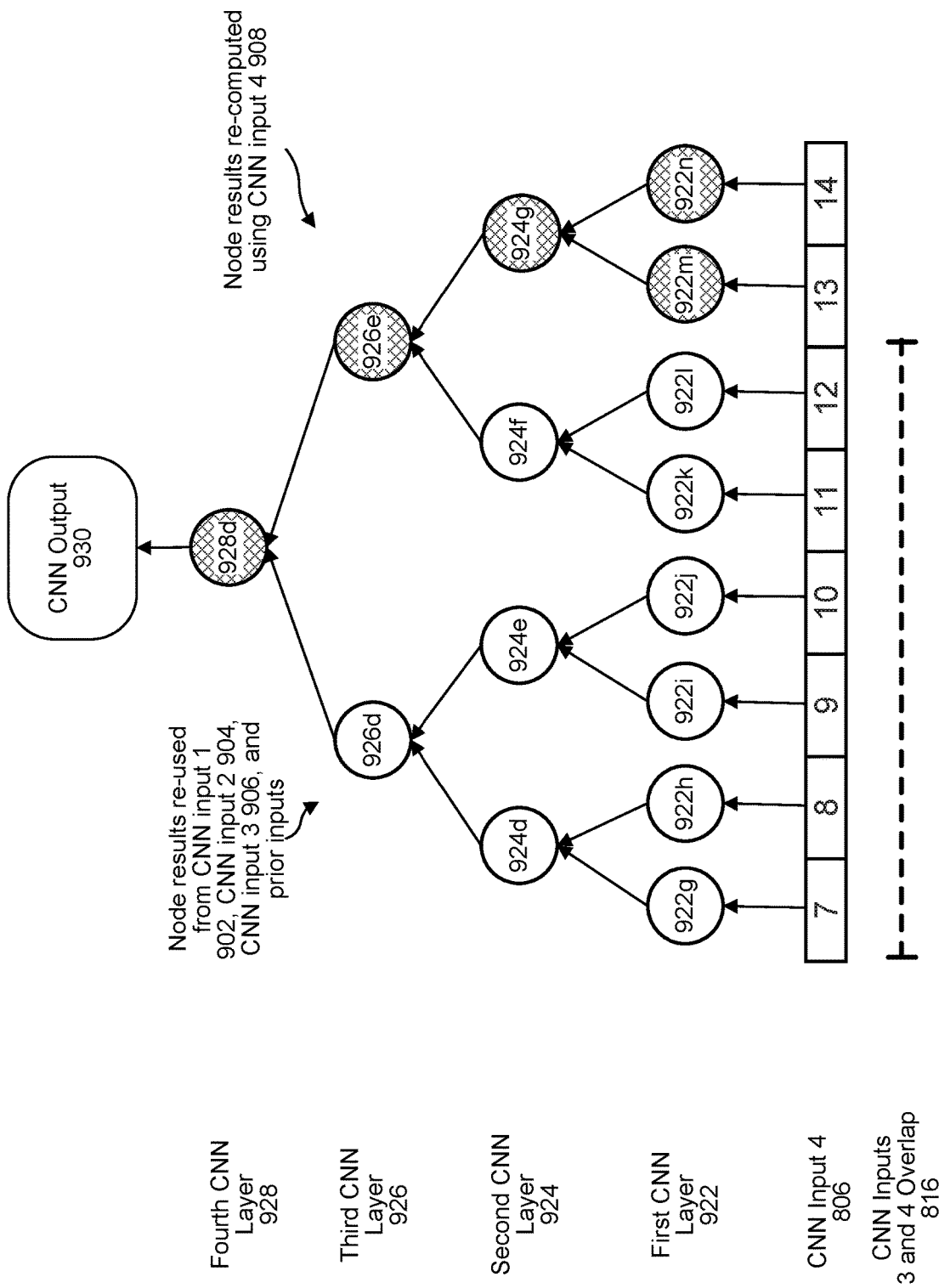

FIG. 9E illustrates a configuration of the CNN model 502 after receiving the fourth CNN input 908. As before, outputs 922g-922l of the first layer 922, outputs 924d-924f of the second layer 924, and output 926d of the third layer 926 are shifted left, and the two rightmost outputs 922m, 922n of the first layer, the output 924g of the last node of the second layer 924, the output 92ed of the last node of third layer 926, and the output 928d of the fourth layer 928 are re-computed using the new frames 13 and 14. As further CNN inputs received, further outputs of nodes are shifted or re-computed in a similar manner.

Figure 10:
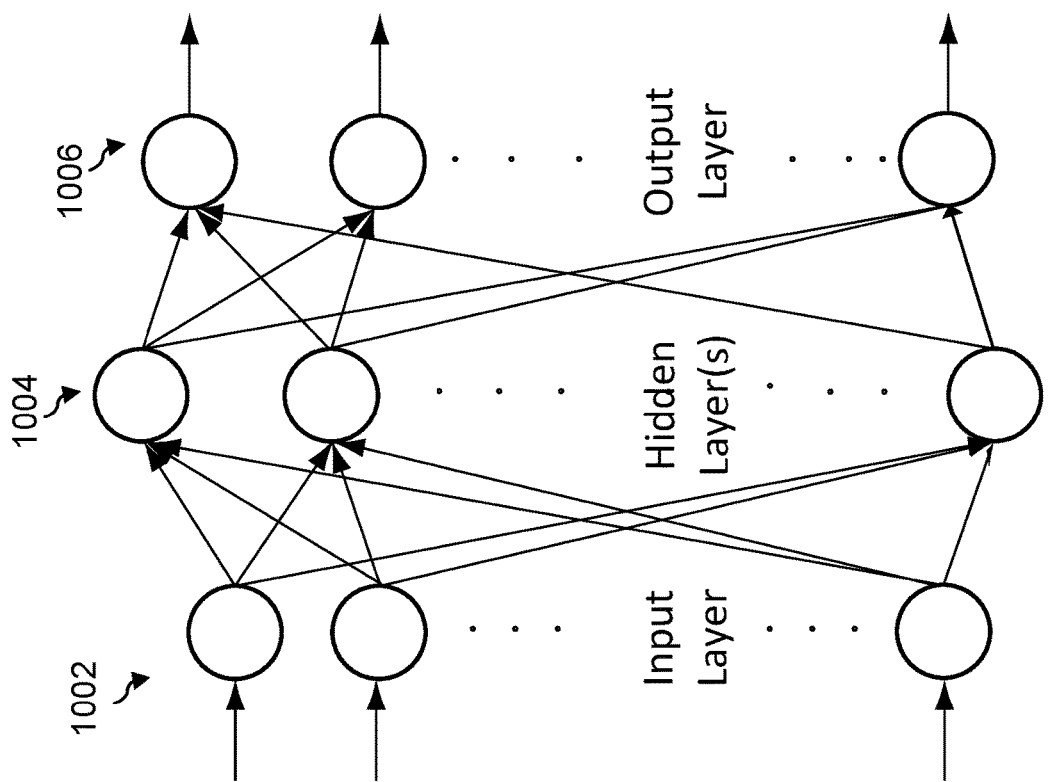
FIG. 10 illustrates a neural-network model in accordance with embodiments of the present disclosure.

Neural networks may be used to perform dialog processing, including translation-model processing and language-model processing. An example neural network, which may be the CNN model 502, is illustrated in FIG. 10. The neural network may include nodes organized as an input layer 1002, a hidden layer 1004, and an output layer 1006. The input layer 1002 may include m nodes, the hidden layer 1004 n nodes, and the output layer 1006 o nodes, where m, n, and o may be any numbers and may represent the same or different numbers of nodes for each layer. Nodes of the input layer 1002 may receive inputs, and nodes of the output layer 1006 may produce outputs. Each node of the hidden layer 1004 may be connected to one or more nodes in the input layer 1002 and one or more nodes in the output layer 1004. Although the neural network illustrated in FIG. 10 includes a single hidden layer 1004, other neural network may include multiple middle layers 1004; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

Figure 11:
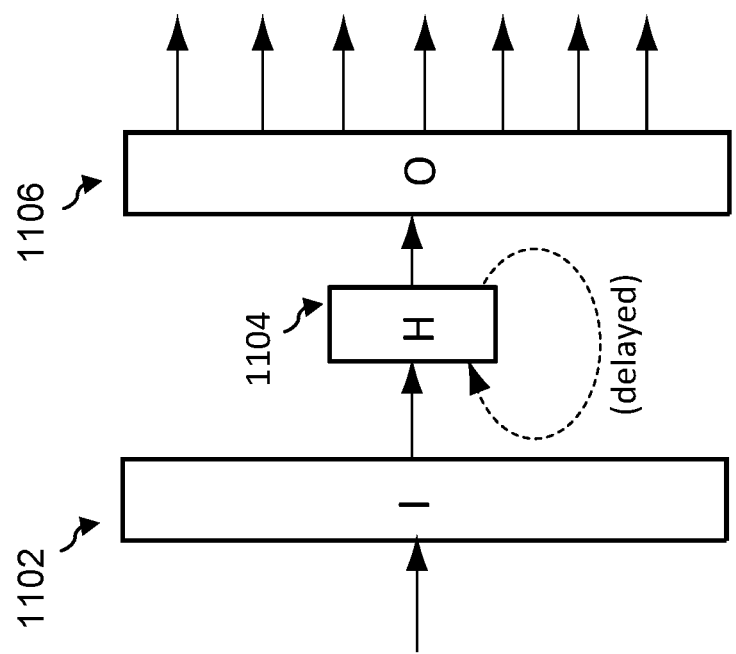
FIG. 11 illustrates a recurrent neural-network model in accordance with embodiments of the present disclosure.

In one aspect, a neural network is constructed using recurrent connections such that one or more outputs of the hidden layer of the network feeds back into the hidden layer again as a next set of inputs. Such a neural network is illustrated in FIG. 11. Each node of the input layer 1102 connects to each node of the hidden layer 1104; each node of the hidden layer 1104 connects to each node of the output layer 1106. As illustrated, one or more outputs 1108 of the hidden layer 1104 is fed back into the hidden layer 1104 for processing of the next set of inputs. A neural network incorporating recurrent connections may be referred to as a recurrent neural network (RNN); this RNN may be the RNN model 508.

In the case in which a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 11, the prediction of the potential next word may be based on previous words in an utterance and not just on the most recent word. The language model neural network may also output weighted predictions for the next word.

Processing by a neural network may be determined by the learned weights on each node input and the structure of the network. Given a particular input, the neural network determines the output one layer at a time until the output layer of the entire network is calculated. Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 12:
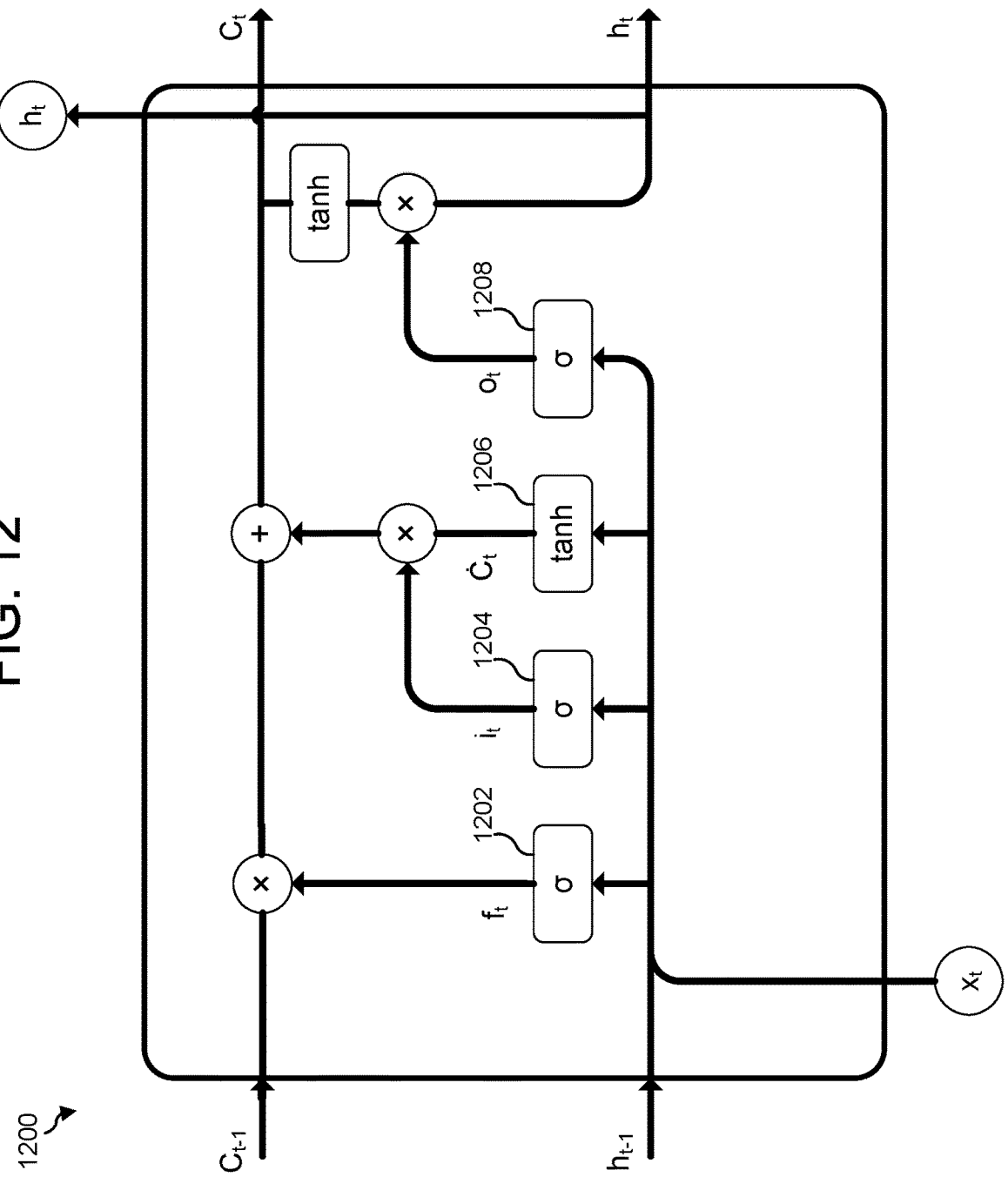
FIG. 12 illustrates a neural-network node in accordance with embodiments of the present disclosure.

FIG. 12 illustrates an exemplary long short-term memory (LSTM) cell 1200 capable of learning long-term dependencies. The LSTM cell 1200 may be incorporated in, for example, the RNN model 508 of FIG. 5. The LSTM cell 1200 receives an input vector $x_t$ and generates an output vector $h_t$. The input vector $x_t$ may be the output of the CNN model 502 and may include the encoded feature vector 504 and/or the wakeword posterior 506; the output vector $h_t$ may include the wakeword detection hypothesis 406.

The cell further maintains a cell state $C_t$ that is updated given the input $x_t$, a previous cell state $C_{t-1}$, and a previous output $h_{t-1}$. Using the previous state and input, a particular cell may take as input not only new data ($x_t$) but may also consider data ($C_{t-1}$ and $h_{t-1}$) corresponding to the previous cell. The output $h_t$ and new cell state $C_t$ are created in accordance with a number of neural network operations or "layers," such as a "forget gate" layer 1202, an "input gate" layer 1204, a tanh layer 1206, and a sigmoid layer 1208.

The forget gate layer 1202 may be used to remove information from the previous cell state $C_{t-1}$. The forget gate layer 1202 receives the input $x_t$ and the previous output $h_{t-1}$ and outputs a number between 0 and 1 for each number in the cell state $C_{t-1}$. A number closer to 1 retains more information from the corresponding number in the cell state $C_{t-1}$, while a number closer to 0 retains less information from the corresponding number in the cell state $C_{t-1}$. The output $f_t$ of the forget gate layer 1202 may be defined by the below equation.

$$f_t = \sigma\{W_f \cdot [(h_{t-1}),(x_t)] + b_f\} \quad (1)$$

The input gate layer 1204 and the tanh layer 1206 may be used to decide what new information should be stored in the cell state $C_{t-1}$. The input gate layer 1204 determines which values are to be updated by generating a vector $i_t$ of numbers between 0 and 1 for information that should not and should be updated, respectively. The tanh layer 1206 creates a vector $\dot{C}_t$ of new candidate values that might be added to the cell state $C_t$. The vectors $i_t$ and $\dot{C}_t$, defined below, may thereafter be combined and added to the combination of the previous state $C_{t-1}$ and the output $f_t$ of the forget gate layer 1202 to create an update to the state $C_t$.

$$i_t = \sigma\{W_i \cdot [(h_{t-1}),(x_t)] + b_i\} \quad (2)$$

$$\dot{C}_t = \tanh\{W_C \cdot [(h_{t-1}),(x_t)] + b_c\} \quad (3)$$

Once the new cell state $C_t$ is determined, the sigmoid layer 1208 may be used to select which parts of the cell state $C_t$ should be combined with the input $x_t$ to create the output $h_t$. The output $o_t$ of the sigmoid layer 1208 and output $h_t$ may thus be defined by the below equations. These values may be further updated by sending them again through the cell 1200 and/or through additional instances of the cell 1200.

$$o_t = \sigma\{W_o \cdot [(h_{t-1}),(x_t)] + b_o\} \quad (4)$$

$$h_t = o_t \cdot [\tanh(C_t)] \quad (5)$$

Figure 13:
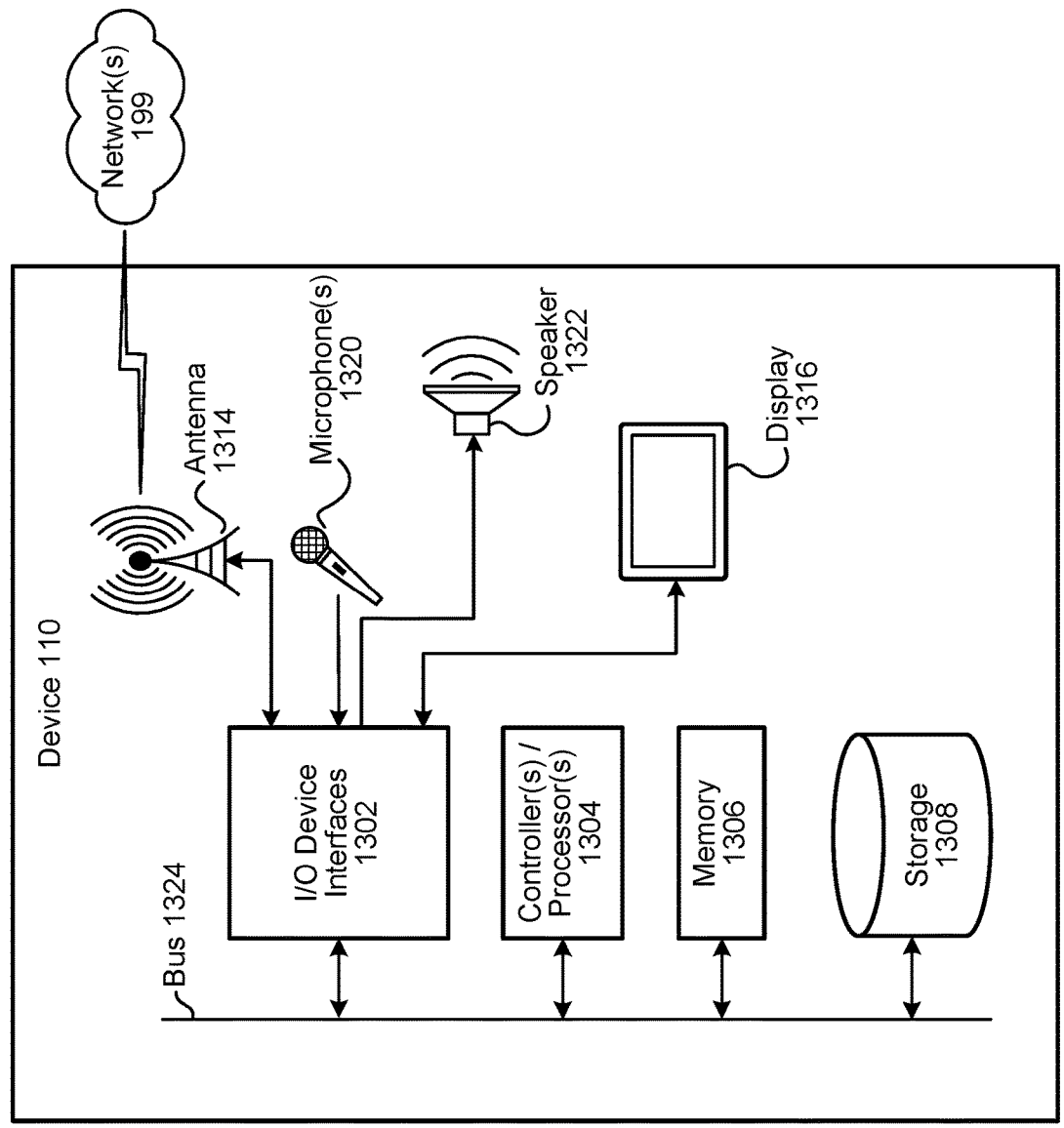
FIG. 13 illustrates components of a device in accordance with embodiments of the present disclosure.
Figure 14:
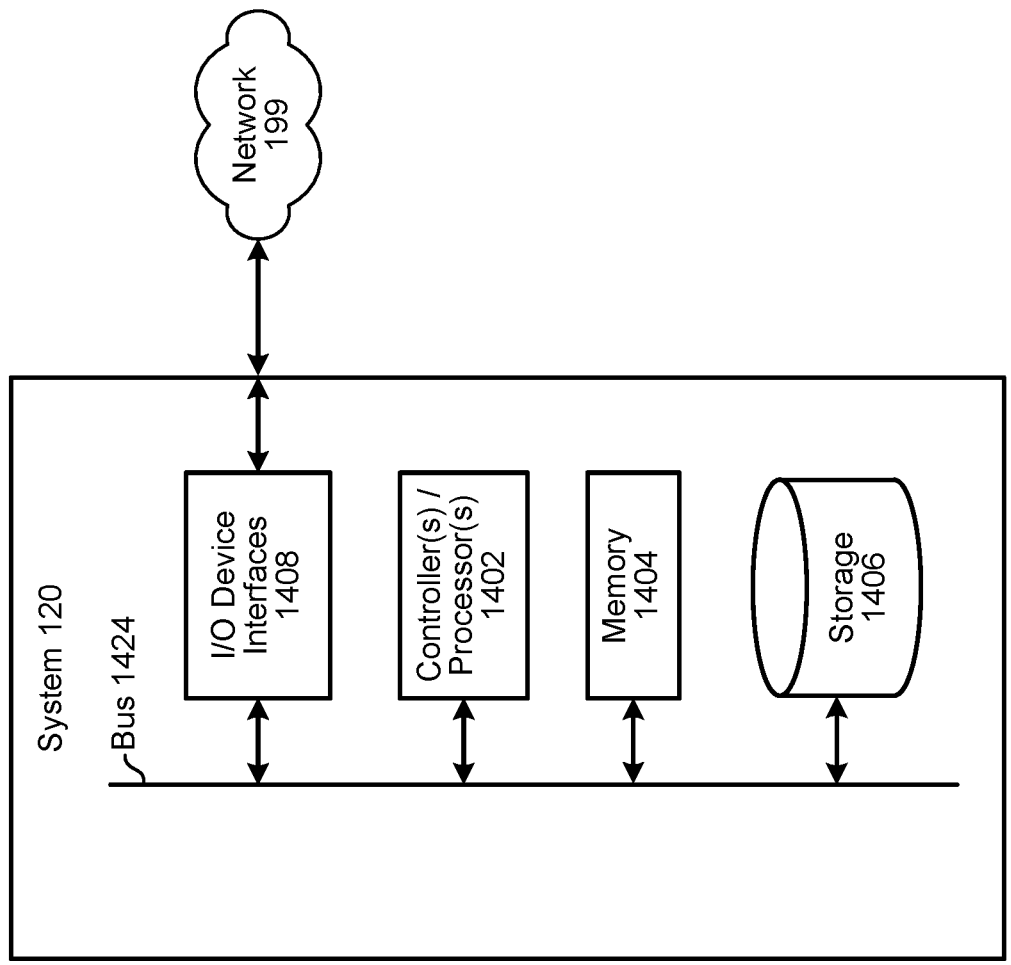
FIG. 14 illustrates components of a server in accordance with embodiments of the present disclosure.

FIG. 13 is a block diagram conceptually illustrating example components of the device 110. FIG. 14 is a block diagram conceptually illustrating example components of a remote device, such as the system 120, which may assist with ASR processing, NLU processing, etc. Multiple servers may be included in the system 120, such as one or more servers for performing ASR, one or more servers for performing NLU, etc. In operation, each of these devices (or groups of devices) may include computer-readable and computer-executable instructions that reside on the respective device (110/120), as discussed further below.

The device 110 and/or the system 120 may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. The device 110 and/or the system 120 may also include a data storage component (1308/1408) for storing data and controller/processor-executable instructions. Each data storage component (1308/1408) may individually include one or more non-volatile storage types such as magnetic storage, optical storage, solid-state storage, etc. The device 110 and/or the system 120 may also be connected to removable or external non-volatile memory and/or storage (such as a removable memory card, memory key drive, networked storage, etc.) through respective input/output device interfaces (1302/1402).

Computer instructions for operating the device 110 and/or the system 120 and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

The device 110 and/or the system 120 may include input/output device interfaces (1302/1402). A variety of components may be connected through the input/output device interfaces (1302/1402), as will be discussed further below. Additionally, each device (110/120) may include an address/data bus (924/1424) for conveying data among components of the respective device. Each component within a device (110/120) may also be directly connected to other components in addition to (or instead of) being connected to other components across the bus (924/1424).

Referring to FIG. 13, the device 110 may include input/output device interfaces 1302 that connect to a variety of components such as an audio output component such as a speaker 922, a wired headset or a wireless headset, or other component capable of outputting audio. The device 110 may also include an audio capture component. The audio capture component may be, for example, a microphone 1320 or array of microphones, a wired headset or a wireless headset, etc. The device 110 may additionally include a display 1316 for visually presenting content.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network 199, the system may be distributed across a networked environment. The I/O device interface (1302/1402) may also include communication components that allow data to be exchanged between devices such as different physical servers in a collection of servers or other components.

The components of the device 110 and the system 120 may include their own dedicated processors, memory, and/or storage. Alternatively, one or more of the components of the device 110 and the system 120 may utilize the I/O interfaces (1302/1402), processor(s) (1304/1404), memory (1306/1406), and/or storage (1308/1408) of the device 110 and system 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the system 120, as described herein, are illustrative, and may be located as a stand-alone device or may be included, in whole or in part, as a component of a larger device or system.

Figure 15:
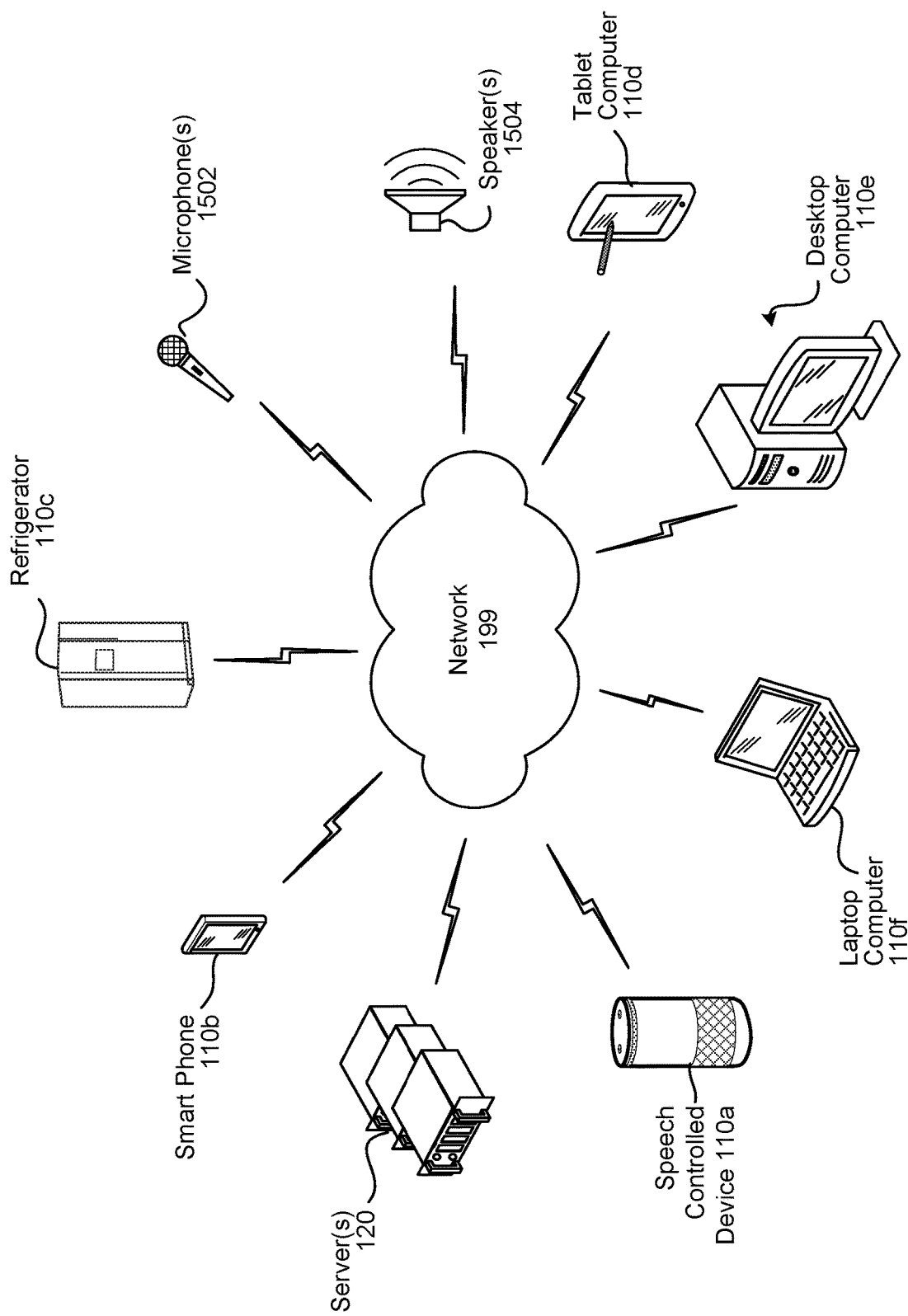
FIG. 15 illustrates a computer network for use with embodiments of the present disclosure.

As illustrated in FIG. 15, multiple devices (110a-110g, 120, 1502, 1504) may contain components of the present disclosure and the devices may be connected over a network 199. The network 199 may include a local or private network or may include a wide-area network, such as the Internet. Devices may be connected to the network 199 through either wired or wireless connections. For example, a speech-controlled device 110a, a smart phone 110b, a refrigerator 110c, a tablet computer 110d, a desktop computer 110e, and/or laptop computer 110f may be connected to the network 199 through a wireless service provider, over a WiFi or cellular network connection, or the like. A microphone 1502 and a speaker 1504 may further be connected to the network 199. Other devices are included as network-connected support devices, such as the system 120, or others. The support devices may connect to the network 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from at least one microphone, audio data;
   determining, using a voice-activity detection (VAD) component, that the audio data includes a representation of speech;
   determining, using an acoustic feature extractor, a first plurality of acoustic feature vectors representing a first portion of the audio data;
   determining, using a convolutional neural-network (CNN) model and the first plurality of acoustic feature vectors, a first encoded feature vector;
   receiving, from memory, neural-network parameters determined based at least in part on training data;
   determining, using a first instance of a long short-term memory (LSTM) model, and the first encoded feature vector, a first wakeword-detection hypothesis that the first portion of the audio data represents a wakeword, the first instance of the LSTM model being initialized using the neural-network parameters;
   determining that the first wakeword-detection hypothesis satisfies a first condition;
   determining, using the acoustic feature extractor and a second portion of the audio data, a second plurality of acoustic feature vectors, the second plurality of acoustic feature vectors having at least one acoustic feature vector different from the first plurality of acoustic feature vectors;
   determining, using the CNN model and the second plurality of acoustic feature vectors, a second encoded feature vector;
   determining, using a second instance of the LSTM model and the second encoded feature vector, a second wakeword-detection hypothesis that the second portion of the audio data represents the wakeword, the second instance of the LSTM model being initialized using the neural-network parameters;
   determining that the second wakeword-detection hypothesis satisfies a second condition; and
   in response to determining that the second wakeword-detection hypothesis is greater than a detection threshold, sending, to a remote system, data representing the speech.

2. The computer-implemented method of claim 1, further comprising:
   determining, using the CNN model and the second plurality of acoustic feature vectors, a wakeword posterior corresponding to a likelihood that the audio data includes a representation of the wakeword; and
   prior to determining the second wakeword-detection hypothesis, determining that the wakeword posterior is greater than a posterior threshold.

3. The computer-implemented method of claim 1, further comprising:
   determining, using the acoustic feature extractor and the audio data, a third plurality of acoustic feature vectors;
   determining that a number of the acoustic feature vectors is greater than a vector threshold;
   determining, using the CNN model and a third plurality of acoustic feature vectors, a third encoded feature vector;
   ceasing processing of the first instance of the LSTM model; and
   determining, using a third instance of the LSTM model and the third encoded feature vector, a third wakeword-detection hypothesis that a third portion of the audio data represents the wakeword, the third instance of the LSTM model being initialized using the neural-network parameters.

4. The computer-implemented method of claim 1, further comprising:
   determining that the first plurality of acoustic feature vectors and the second plurality of acoustic feature vectors have in common at least a first acoustic feature vector and a second acoustic feature vector;
   determining, using the CNN model, a first node output using the first acoustic feature vector, the first node output corresponding to the first encoded feature vector;
   determining, using the CNN model, a second node output using the second acoustic feature vector, the second node output corresponding to the second encoded feature vector;
   storing, in the memory, the first node output and the second node output; and
   wherein determining the second encoded feature vector comprises receiving, from the memory, the first node output and the second node output.

5. A computer-implemented method comprising:
   receiving audio data representing an utterance;
   receiving, from memory, neural-network parameters determined based at least in part on training data;
   processing, using a first instance of a recurrent neural-network (RNN) model, a first portion of the audio data to determine a first likelihood that the first portion represents a wakeword, the first instance initialized using the neural-network parameters determined based at least in part on the training data;

determining that the first likelihood fails to satisfy a condition;

processing, using a second instance of the RNN model, a second portion of the audio data to determine a second likelihood that the second portion represents the wakeword, the second instance initialized using the neural-network parameters determined based at least in part on the training data;

determining that the second likelihood satisfies the condition; and based at least in part on determining that the second likelihood satisfies the condition, causing speech processing to be performed using the audio data.

6. The computer-implemented method of claim 5, further comprising:

determining, using the first portion of the audio data, a first plurality of acoustic feature vectors;

determining, using the second portion of the audio data, a second plurality of acoustic feature vectors;

determining, using a convolutional neural-network (CNN) model, a first encoded feature vector based at least in part on the first plurality of acoustic feature vectors; and determining, using the CNN model, a second encoded feature vector based at least in part on the second plurality of acoustic feature vectors, wherein the first likelihood is further determined based at least in part on the first encoded feature vector, and wherein the second likelihood is further determined based at least in part on the second encoded feature vector.

7. The computer-implemented method of claim 6, further comprising:

determining, using the CNN model and the second plurality of acoustic feature vectors, a wakeword posterior corresponding to a third likelihood that the second portion of the audio data includes a representation of the wakeword; and prior to determining the second likelihood, determining that the wakeword posterior satisfies a second condition.

8. The computer-implemented method of claim 7, further comprising:

determining, using the CNN model and a third plurality of acoustic feature vectors, a second wakeword posterior corresponding to a likelihood that a third portion of the audio data includes a representation of the wakeword;

determining that the second wakeword posterior fails to satisfy the second condition; and based at least in part on determining that the second wakeword posterior fails to satisfy the second condition, ceasing processing of the audio data using the second instance of the RNN model.

9. The computer-implemented method of claim 6, wherein determining the first encoded feature vector is further based at least in part on:

determining that the first plurality of acoustic feature vectors and the second plurality of acoustic feature vectors have in common at least a first acoustic feature vector and a second acoustic feature vector;

determining, using the CNN model, a first node output using the first acoustic feature vector, the first node output corresponding to the first encoded feature vector; and determining, using the CNN model, a second node output second the first acoustic feature vector, the second node output corresponding to the first encoded feature vector, wherein the second encoded feature vector is based at least in part on the first node output and the second node output.

10. The computer-implemented method of claim 5, further comprising:

processing, using the first instance of the RNN model, a third portion of the audio data to determine a third likelihood that the audio data represents the wakeword; and ceasing processing of the audio data using the first instance of the RNN model.

11. The computer-implemented method of claim 5, further comprising:

determining, using the first instance of the RNN model, that the audio data includes a representation of a second word; and determining that the second word is associated with the wakeword, wherein determining that the second likelihood satisfies the condition is based at least in part on determining that the second word is associated with the wakeword.

12. The computer-implemented method of claim 5, further comprising:

determining, using the first instance of the RNN model, that the audio data includes a representation of a second word;

determining that the second word is unassociated with the wakeword; and based at least in part on determining that the second word is unassociated with the wakeword, ceasing sending, to a remote system, data corresponding to the audio data.

13. A system comprising:

at least one first processor; and at least one memory including instructions that, when executed by the at least one processor, cause the system to:

receive audio data representing an utterance;

receive, from the at least one memory, neural-network parameters determined based at least in part on training data;

process, using a first instance of a recurrent neural-network (RNN) model, a first portion of the audio data to determine a first likelihood that the first portion represents a wakeword, the first instance initialized using the neural-network parameters determined based at least in part on the training data;

determine that the first likelihood fails to satisfy a condition;

process, using a second instance of the RNN model, a second portion of the audio data to determine a second likelihood that the second portion represents the wakeword, the second instance initialized using the neural-network parameters determined based at least in part on the training data;

determine that the second likelihood satisfies the condition; and based at least in part on determining that the second likelihood satisfies the condition, cause speech processing to be performed using the audio data.

14. The system of claim 13, wherein the at least one memory further includes instructions that, when executed by the at least one processor, further cause the system to:
- determine, using the first portion of the audio data, a first plurality of acoustic feature vectors;
- determine, using the second portion of the audio data, a second plurality of acoustic feature vectors;
- determine, using a convolutional neural-network (CNN) model, a first encoded feature vector based at least in part on the first plurality of acoustic feature vectors; and
- determine, using the CNN model, a second encoded feature vector based at least in part on the second plurality of acoustic feature vectors,
- wherein the first likelihood is further determined based at least in part on the first encoded feature vector, and
- wherein the second likelihood is further determined based at least in part on the second encoded feature vector.

15. The system of claim 14, wherein the at least one memory further includes instructions that, when executed by the at least one processor, further cause the system to:
- determine, using the CNN model and the second plurality of acoustic feature vectors, a wakeword posterior corresponding to a third likelihood that the second portion of the audio data includes a representation of the wakeword; and
- prior to determining the second likelihood, determining that the wakeword posterior fails to satisfy a second condition.

16. The system of claim 15, wherein the at least one memory further includes instructions that, when executed by the at least one processor, further cause the system to:
- determine, using the CNN model and a third plurality of acoustic feature vectors, a second wakeword posterior corresponding to a likelihood that a third portion of the audio data includes a representation of the wakeword;
- determine that the second wakeword posterior fails to satisfy the second condition; and
- based at least in part on determining that the second wakeword posterior fails to satisfy the second condition, cease processing of the audio data using the second instance of the RNN model.

17. The system of claim 14, wherein the at least one memory further includes instructions that, when executed by the at least one processor, further cause the system to:
- determine that the first plurality of acoustic feature vectors and the second plurality of acoustic feature vectors have in common at least a first acoustic feature vector and a second acoustic feature vector;
- determine, using the CNN model, a first node output using the first acoustic feature vector, the first node output corresponding to the first encoded feature vector; and
- determine, using the CNN model, a second node output second the first acoustic feature vector, the second node output corresponding to the first encoded feature vector,
- wherein the second encoded feature vector is based at least in part on the first node output and the second node output.

18. The system of claim 13, wherein the at least one memory further includes instructions that, when executed by the at least one processor, further cause the system to:
- process, using the first instance of the RNN model, a third portion of the audio data to determine a third likelihood that the audio data represents the wakeword; and
- cease processing of the audio data using the first instance of the RNN model.

19. The system of claim 13, wherein the at least one memory further includes instructions that, when executed by the at least one processor, further cause the system to:
- determine, using the first instance of the RNN model, that the audio data includes a representation of a second word; and
- determine that the second word is associated with the wakeword,
- wherein determining that the second likelihood satisfies the condition is based at least in part on determining that the second word is associated with the wakeword.

20. The system of claim 13, wherein the at least one memory further includes instructions that, when executed by the at least one processor, further cause the system to:
- send, to a remote system, data corresponding to the audio data;
- determine, using the first instance of the RNN model, that the audio data includes a representation of a second word;
- determine that the second word is unassociated with the wakeword; and
- based at least in part on determining that the second word is unassociated with the wakeword, cease sending of the data.

* * * * *